(12) United States Patent
Fuchs et al.

(10) Patent No.: US 8,940,904 B2
(45) Date of Patent: *Jan. 27, 2015

(54) USE OF TRANSITION METAL-CARBENE COMPLEXES WHICH DO NOT COMPRISE ANY CYCLOMETALLATION VIA NON-CARBENES IN OLEDS

(75) Inventors: Evelyn Fuchs, Mannheim (DE); Oliver Molt, Hirschberg (DE); Christian Lennartz, Schifferstadt (DE); Jens Rudolph, Worms (DE); Klaus Kahle, Ludwigshafen (DE); Christian Schildknecht, Dannstadt-Schauernheim (DE); Thomas Strassner, Dresden (DE); Nicolle Langer, Heppenheim (DE)

(73) Assignee: BASF SE, Ludwigshafen (DE)

( * ) Notice: Subject to any disclaimer, the term of this patent is extended or adjusted under 35 U.S.C. 154(b) by 561 days.

This patent is subject to a terminal disclaimer.

(21) Appl. No.: 12/306,791

(22) PCT Filed: Jun. 25, 2007

(86) PCT No.: PCT/EP2007/056334
§ 371 (c)(1),
(2), (4) Date: Jun. 13, 2011

(87) PCT Pub. No.: WO2008/000727
PCT Pub. Date: Jan. 3, 2008

(65) Prior Publication Data
US 2011/0034699 A1 Feb. 10, 2011

(30) Foreign Application Priority Data
Jun. 26, 2006 (EP) .................... 06116093

(51) Int. Cl.
*C09K 11/06* (2006.01)
*H05B 33/14* (2006.01)

(52) U.S. Cl.
CPC ............... *C09K 11/06* (2013.01); *H05B 33/14* (2013.01); *C09K 2211/1044* (2013.01); *C09K 2211/185* (2013.01)
USPC ..................................... 548/103

(58) Field of Classification Search
CPC ........... C09K 11/06; C09K 2211/1044; C09K 2211/185; H05B 33/14
USPC ..................................... 548/103
See application file for complete search history.

(56) References Cited

U.S. PATENT DOCUMENTS

2005/0260445 A1* 11/2005 Walters et al. ............... 428/690
2006/0258043 A1 11/2006 Bold et al.
2007/0282076 A1 12/2007 Bold et al.
2008/0018221 A1 1/2008 Egen et al.
2010/0213834 A1 8/2010 Molt et al.

FOREIGN PATENT DOCUMENTS

| DE | 10 2004 040 005 A1 | 2/2006 |
|----|-------------------|--------|
| DE | 10 2004 057 072 A1 | 6/2006 |
| DE | 10 2005 058 206 A1 | 6/2006 |
| JP | WO 2006/115301 | * 11/2006 |
| WO | WO 2005/019373 A2 | 3/2005 |
| WO | WO 2005/113704 | * 12/2005 |
| WO | WO 2005/113704 A2 | 12/2005 |
| WO | WO 2006/018292 A1 | 2/2006 |
| WO | WO 2006/058535 A1 | 6/2006 |

OTHER PUBLICATIONS

Heckenroth et al. (Inorganica Chimica Acta 359 (2006), p. 1929-1938.*
Xue et al. (Organometallics (1998), 17, 1622-1630; ).*
Dörwald, F. Zaragoza. Side Reactions in Organic Synthesis: A Guide to Successful Synthesis Design, Weinheim: WILEY-VCH Verlag GmbH & Co. KGaA, 2005, Preface.*
U.S. Appl. No. 12/667,765, filed Jan. 5, 2010, Langer, et al.
U.S. Appl. No. 12/667,619, filed Jan. 4, 2010, Langer, et al.
Carol A. Quezada, et al., "Synthesis and structural characterization of two bis(imidazol-2-ylidene) complexes of Pt(II)", Journal of Organometallic Chemistry, vol. 671, 2003, pp. 183-186.
Marion Heckenroth, et al., "Synthesis and structural analysis of palladium biscarbene complexes derived from bisimidazolium ligand precursors", Inorganica Chimica Acta, vol. 359, 2006, pp. 1929-1938.
Wen-Mei Xue, et al., "Spectroscopic and Excited-State Properties of Luminescent Rhenium(I) N-Heterocyclic Carbene Complexes Containing Aromatic Diimine Ligands", Organometallics, vol. 17, XP-002309657, 1998, pp. 1622-1630.
Siu-Wai Lai, et al., "Luminescent metal complexes derived from carbene and related ligands: tuning excited-state properties with metal—carbon multiple bonds", Journal of Organometallic Chemistry, vol. 617-618, XP-004315036, Jan. 15, 2001, pp. 133-140.
Qing-Xiang Liu, et al., "Synthesis, crystal structure and photophysical properties of N-heterocyclic carbene Pd(II), Pt(II) complexes and iodine adduct", Polyhedron, vol. 22, XP-002309655, Jun. 15, 2003, pp. 1515-1521.
U.S. Appl. No. 12/597,651, filed Oct. 26, 2009, Moonen, et al.

* cited by examiner

*Primary Examiner* — Kristin Vajda
*Assistant Examiner* — Valerie Rodriguez-Garcia
(74) *Attorney, Agent, or Firm* — Oblon, Spivak, McClelland, Maier & Neustadt, L.L.P.

(57) ABSTRACT

The present invention relates to the use of transition metal-carbene complexes, in which the carbene ligand(s) is bonded to the transition metal exclusively via carbene carbon atoms, in organic light-emitting diodes, to organic light-emitting diodes comprising at least one aforementioned transition metal-carbene complex, to a light-emitting layer comprising at least one aforementioned transition metal-carbene complex, to organic light-emitting diodes comprising at least one inventive light-emitting layer, and to devices which comprise at least one inventive organic light-emitting diode.

4 Claims, No Drawings

USE OF TRANSITION METAL-CARBENE COMPLEXES WHICH DO NOT COMPRISE ANY CYCLOMETALLATION VIA NON-CARBENES IN OLEDS

The present invention relates to the use of transition metal-carbene complexes in which the carbene ligand(s) is bonded to the transition metal exclusively via carbene carbon atoms in organic light-emitting diodes, to organic light-emitting diodes comprising at least one aforementioned transition metal-carbene complex, to a light-emitting layer comprising at least one aforementioned transition metal-carbene complex, to organic light-emitting diodes comprising at least one inventive light-emitting layer, and to devices which comprise at least one inventive organic light-emitting diode.

In organic light-emitting diodes (OLEDs), the property of materials to emit light when they are excited by electrical current is exploited. OLEDs are of interest especially as an alternative to cathode ray tubes and liquid-crystal displays for the production of flat visual display units. Owing to the very compact design and the intrinsically low electricity consumption, the devices comprising OLEDs are especially suitable for mobile applications, for example for uses in cellphones, laptops, etc.

The basic principles of the functioning of OLEDs and suitable assemblies (layers) of OLEDs are specified, for example, in WO 2005/113704 and the literature cited therein.

The prior art has already proposed numerous materials which emit light on excitation by electrical current.

WO 2005/019373 for the first time discloses the use of uncharged transition metal complexes which comprise at least one carbene ligand in OLEDs. According to WO 2005/019373, these transition metal complexes can be used in any layer of an OLED, the ligand structure or central metal being variable for adjustment to desired properties of the transition metal complexes. For example, the use of the transition metal complexes in a blocking layer for electrons, a blocking layer for excitons, a blocking layer for holes, or the light-emitting layer of the OLED is possible, preference being given to using the transition metal complexes as emitter molecules in OLEDs.

WO 2005/113704 relates to luminescent compounds which bear carbene ligands. WO 2005/113704 specifies numerous transition metal complexes with different carbene ligands, preference being given to using the transition metal complexes as phosphorescent light-emitting material, more preferably as a doping substance.

Both the transition metal-carbene complexes disclosed in WO 2005/019373 and those disclosed in WO 2005/113704 have carbene ligands which are bonded to the transition metal atom by cyclometalation. The carbene ligand(s) is/are bonded to the transition metal firstly via the carbene carbon atom and secondly via a further carbon atom or heteroatom.

With respect to the aforementioned prior art, it is an object of the present invention to provide further transition metal-carbene complexes for use in OLEDs, which exhibit a balanced property spectrum, for example good efficiencies, improved lifetime and higher stability.

This object is achieved by the use of transition metal complexes of the general formula (I) in organic light-emitting diodes

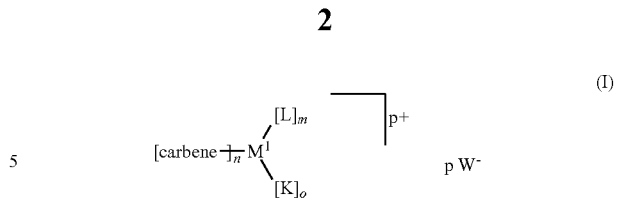

in which the symbols are each defined as follows:
$M^1$ is a metal atom selected from the group consisting of transition metals of group IIB, IIIB, IVB, VB, VIIB, VIIB, VIII of the Periodic Table of the Elements (CAS version) and Cu, in any oxidation state possible for the particular metal atom;
K is an uncharged mono- or bidentate ligand;
L is a mono- or dianionic ligand which may be mono- or bidentate;
m is from 0 to 5;
o is from 0 to 5;
n is from 1 to 6;
p is the charge of the complex: 0, 1, 2, 3, 4;
$W^-$ is a monoanionic counterion;
  where m, o, n and p are dependent upon the oxidation state and coordination number of the metal atom used and upon the charge of the ligands and the overall charge of the complex,
carbene is a carbene ligand of the general formula (II)

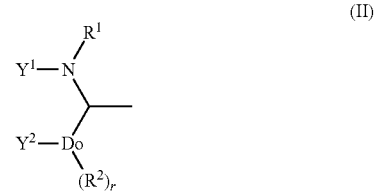

in which the symbols are each defined as follows:
Do is a donor atom selected from the group consisting of N, C, P, O, S and Si;
r is 2 when Do is C or Si, is 1 when Do is N or P, and is 0 when Do is O or S;
$Y^1, Y^2$
  are each independently hydrogen or a carbon-containing group selected from the group consisting of alkyl, cycloalkyl, heterocycloalkyl, aryl, heteroaryl, aralkyl, alkenyl and alkynyl groups, where the groups may be substituted or unsubstituted; or
  $Y^1$ and $Y^2$ together form a saturated or unsaturated bridge between the donor atom Do and the nitrogen atom, which has at least two atoms, where one or more atoms of the bridge may optionally be substituted by alkyl or aryl groups, where the groups may be substituted or unsubstituted, and/or groups with donor or acceptor action, and the bridge may optionally be fused to one or more rings;
$R^1, R^2$
  are each independently hydrogen, alkyl, cycloalkyl, heterocycloalkyl, aryl, heteroaryl, aralkyl, alkenyl, alkynyl, where the groups may be substituted or unsubstituted, $BR^3_2$, $NR^{22}_2$, $PR^{23}_2$, $OR^{24}$, $SR^{25}$ or $SiR^4_4$; or
  in the case that n>1—
  $R^1$ and/or $R^2$ may each independently, together with one of the $R^1$ and/or $R^2$ radicals of one or two further carbene ligands, form a bridge, where the bridge may be defined as follows:

alkylene, arylene, heteroarylene, alkynylene, alkenylene, where the groups may be substituted or unsubstituted, $NR^5$, $PR^6$, $BR^7$, $BR^8_2{}^-$, $CR^9(O^-)$, $SO_2$, $SiR^{10}R^{11}$, CO, CO—O, O—CO and $(CR^{12}R^{13})_x$ where one or more nonadjacent $(CR^{12}R^{13})$ groups may be replaced by arylene, heteroarylene, alkynylene, alkenylene, where the groups may be substituted or unsubstituted, $NR^5$, $PR^6$, $BR^7$, $BR^8_2{}^-$, $CR^9(O^-)$, O, S, SO, $SO_2$, $SiR^{10}R^{11}$, CO, CO—O, O—CO; where x is from 2 to 10;

$R^3$, $R^4$, $R^5$, $R^6$, $R^7$, $R^8$, $R^9$, $R^{10}$, $R^{11}$, $R^{22}$, $R^{23}$, $R^{24}$, $R^{25}$
are each independently hydrogen, alkyl, cycloalkyl, heterocycloalkyl, aryl, aralkyl, heteroaryl, alkenyl, alkynyl, alkoxy, where the groups may be substituted or unsubstituted; and $R^{12}$, $R^{13}$
are each independently hydrogen, alkyl, cycloalkyl, heterocycloalkyl, aryl, heteroaryl, aralkyl, alkynyl, alkenyl, where the groups may be substituted or unsubstituted, or groups with donor or acceptor action;

wherein the carbene ligand(s) in the transition metal complexes of the formula I is bonded to the transition metal exclusively via carbene carbon atoms.

It has been found that, surprisingly, sufficiently stable transition metal-carbene complexes suitable for use in OLEDs can be provided without a cyclometalation of the carbene ligand(s) via a further carbon atom or heteroatom being required.

In one embodiment, the present invention relates to the use of the transition metal-carbene complexes of the general formula I, excluding the use of the following transition metal-carbene complexes of the general formulae I' and II'

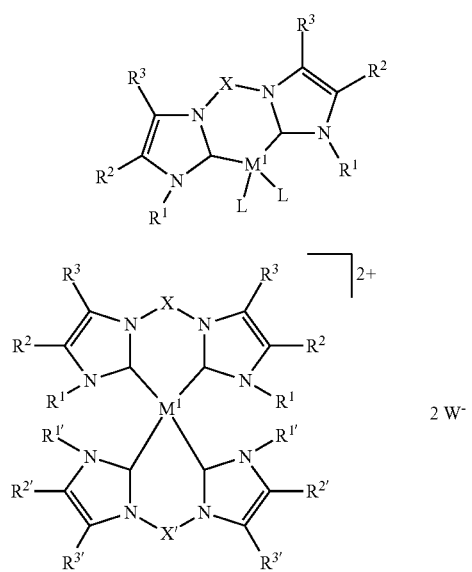

in which the symbols are each defined as follows:
$M^1$ is Pt(II), Pd(II), preferably Pt(II);
L is a monodentate monoanionic ligand, preferably selected independently from halides, pseudohalides⁻, alkoxy and OAc⁻, more preferably Br⁻, I⁻ and OAc⁻; or
  bidentate dianionic ligand, preferably selected from bisphenoxides, bisalkoxides, bisthiolates, bisazolates, bisamides, which may be unsubstituted or optionally mono- or polysubstituted by $C_1$- to $C_6$-alkyl radicals and/or donor/acceptor substituents, preferably unsubstituted bisphenoxide;

$R^1$, $R^{1'}$
are each independently hydrogen, alkyl, cycloalkyl, aryl, heteroaryl, aralkyl, preferably hydrogen, $C_1$-$C_4$-alkyl, cyclohexyl, 2,4,6-trimethylphenyl or benzyl, more preferably methyl, isopropyl, n-butyl;

$R^2$, $R^3$, $R^{2'}$, $R^{3'}$
are each independently hydrogen, alkyl, aryl, preferably hydrogen;

X, X' are each independently alkylene,

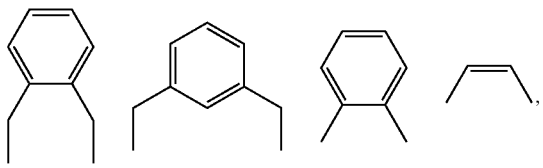

preferably each independently $(CR^4_2)_n$,

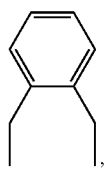

where $R^4$ is H, alkyl and n is from 1 to 3, more preferably $CH_2$,

more preferably $CH_2$;
W⁻ is a monoanionic counterion, preferably halide, pseudohalide or OAc⁻, more preferably Cl⁻, Br⁻, I⁻, CN⁻, OAc⁻, most preferably Br⁻ or I⁻.

If different isomers of the transition metal-carbene complexes of the formula I used in accordance with the invention may be present, the present invention comprises both the individual isomers of the transition metal-carbene complexes of the formula I in each case and mixtures of different isomers in any mixing ratio. In general, different isomers of the metal complexes of the formula I can be separated by processes known to those skilled in the art, for example by chromatography, sublimation or crystallization.

The transition metal-carbene complexes of the formula I may be used in any layer of an OLED, and the ligand structure or central metal can be varied for adjustment to desired properties of the metal complexes. For example, the use of the transition metal-carbene complexes of the formula I in a blocking layer for electrons, a blocking layer for excitons, a blocking layer for holes or the light-emitting layer of the OLED is possible. Preference is given to using the compounds of the formula I as emitter molecules in OLEDs.

A bidentate ligand is understood to mean a ligand which is coordinated to the transition metal atom $M^1$ at two sites.

A monodentate ligand is understood to mean a ligand which is coordinated to the transition metal atom $M^1$ at one site on the ligand.

A tridentate ligand is understood to mean a ligand which is coordinated to the transition metal atom $M^1$ at three sites.

A tetradentate ligand is understood to mean a ligand which is coordinated to the transition metal atom $M^1$ at four sites.

Transition metal-carbene complexes which have exclusively a bond of the carbene ligand(s) to the transition metal atom via carbene carbon atoms are known in the prior art.

W. J. Youngs et al., J. Organomet. Chem. 671 (2003) 183 to 186 relates to the synthesis and structural characterization of two bis(imidazol-2-ylidene)-Pt(II) complexes. However, a use of these complexes is not specified.

M. Albrecht et al., Inorganica Chimica Acta 2006, Vol 359, 6, 1929-1938 relates to the synthesis and structural analysis of palladium-biscarbene complexes which bear bisimidazolium ligands. In particular, M. Albrecht et al. relates to mechanistic analyses of the metalation of the bisimidazolium ligand.

Ch.-M. Che et al., Organometallics 1998, 17, 1622 to 1630 relates to an analysis of the spectroscopic properties of luminescent rhenium(I)-N-heterocyclic carbene complexes which bear aromatic diimine ligands. The analysis of the spectroscopic properties of the complexes serves for a better understanding of the electronic conditions in these complexes. A use of the N-heterocyclic rhenium(I)-carbene complexes and possible electroluminescent properties are not reported in Ch.-M. Che.

In addition, DE-A 10 2005 058 206 discloses N-heterocyclic biscarbene complexes of platinum and of palladium, their preparation and their use as a catalyst, especially as a catalyst for the partial oxidation of hydrocarbons or hydrocarbon-containing charges. DE-A 10 2005 058 206 does not comprise any information regarding the luminescence properties of the complexes disclosed.

The suitability of transition metal-carbene complexes of the formula I according to the present invention for use in OLEDs is not mentioned in any of the aforementioned documents. It has thus been found that the transition metal-carbene complexes of the formula I according to the present application are suitable for use in OLEDs.

The transition metal-carbene complexes of the formula I used in accordance with the invention preferably have a metal atom $M^1$ selected from the group consisting of Ir, Co, Rh, Ni, Pd, Pt, Fe, Ru, Os, Cr, Mo, W, Mn, Tc, Re and Cu, more preferably Ir, Os, Ru, Rh, Pd, Co, Ni and Pt, most preferably Ir, Pt, Rh, Ru and Os, in any oxidation state possible for the particular metal atom. Preference is given in particular to using Pt(II), Pt(IV), Ir(I), Ir(III), Os(II) and Ru(II) in the transition metal-carbene complexes of the formula I used in accordance with the invention.

Suitable mono- or dianionic ligands L which may be mono- or bidentate, are the ligands used customarily as mono- or bidentate, mono- or dianionic ligands. Preference is given to using monoanionic monodentate ligands or dianionic bidentate ligands in the transition metal-carbene complexes of the formula I when ligands L are present at all.

Typically, the ligands L used are non-photoactive. Suitable ligands are, for example, monoanionic monodentate ligands such as halides, especially $Cl^-$, $Br^-$, $I^-$, pseudohalides, especially $CN^-$, $OAc^-$, alkyl radicals which are bonded to the transition metal atom $M^1$ via a sigma bond, for example $CH_3$, alkoxides, thiolates, amides ($R^{26}_2N^-$, where $R^{26}$ is hydrogen or a substituted or unsubstituted alkyl or aryl radical); monoanionic bidentate ligands such as acetylacetonate and derivatives thereof, and also the bidentate monoanionic ligands mentioned in WO 02/15645, and oxide. In addition, dianionic bidentate ligands such as bisphenoxides, bisalkoxides, bisthiolates, bisazolates, bisamides, which may be unsubstituted or optionally mono- or polysubstituted by $C_1$- to $C_6$-alkyl radicals and/or donor/acceptor substituents, preferably unsubstituted bisphenolate, can be used as ligands L.

Suitable uncharged mono- or bidentate ligands K are those ligands which are typically used as uncharged mono- or bidentate ligands. In general, the ligands K used in the transition metal-carbene complexes of the formula (I) are non-photoactive ligands. Suitable ligands K are, for example, phosphines, especially trialkylphosphines, e.g. $PEt_3$, $PnBu_3$, triarylphosphines, e.g. $PPh_3$; phosphonates and derivatives thereof, arsenates and derivatives thereof, phosphites, CO, nitriles, amines, dienes which can form a π-complex with $M^1$, e.g. 2,4-hexadiene, $\eta^4$-cyclooctadiene and $\eta^2$-cyclooctadiene (in each case 1,3 and 1,5), allyl, methallyl, cyclooctene, norbornadiene.

Suitable monoanionic counterions W are, for example, halide, pseudohalide, $BF_4^-$, $PF_6^-$, $AsF_6^-$, $SbF_6^-$ or $OAc^-$, preferably $Cl^-$, $Br^-$, $I^-$, $CN^-$, $OAc^-$, more preferably $Br^-$ or $I^-$.

The number n of carbene ligands in the transition metal-carbene complexes of the formula I is from 1 to 6. The number n is based on the number of bonds of carbene carbon atoms to the transition metal $M^1$. This means that, for a bridged carbene ligand of the formula II which has two carbene carbon atoms which can form a bond to the transition metal $M^1$, n=2. For a carbene ligand of the formula II which has four carbene carbon atoms which can form a bond to the transition metal atom $M^1$, n=4. For a transition metal-carbene complex which comprises, for example, three carbene ligands of the formula II which have two carbene carbon atoms which can form a bond to the transition metal atom $M^1$, n=6. n in the transition metal-carbene complexes of the formula I is preferably from 4 to 6, more preferably 4 or 6. When the transition metal-carbene complex of the formula I comprises more than one carbene ligand, the carbene ligands in the transition metal-carbene complex of the formula I may be the same or different.

The number m of monoanionic or dianionic mono- or bidentate ligands L in the transition metal-carbene complex of the formula I is from 0 to 5, preferably from 0 to 2. When m>1, the ligands L may be the same or different; they are preferably the same. The number m is based on the number of bonds to the transition metal $M^1$. This means that, for a bidentate ligand L which has two positions which can form a bond to the transition metal $M^1$, m=2.

The number o of uncharged ligands K in the transition metal-carbene complexes of the formula I is from 0 to 5, preferably from 0 to 2, more preferably 0. When o>1, the ligands K may be the same or different; they are preferably the same.

The number p indicates the charge of the transition metal complex, which may be uncharged (p=0) or may be positively charged (p=1, 2, 3 or 4, preferably 1, 2 or 3, more preferably 1 or 2). More preferably p is 0, 1 or 2. At the same time, the number p indicates the number of monoanionic counterions $W^-$. When the transition metal-carbene complex of the formula I is an uncharged transition metal-carbene complex, p=0. When the transition metal complex is positively charged, the number p of monoanionic counterions corresponds to the positive charge of the transition metal-carbene complex.

The number of carbene, K and L ligands and the number of the monoanionic counterions W, i.e. n, o, m and p, are dependent upon the oxidation state and coordination number of the metal atom $M^1$ used, and upon the charge of the ligands and the overall charge of the complex.

The carbene ligand "carbene" in the transition metal-carbene complexes of the formula I has the general formula (II):

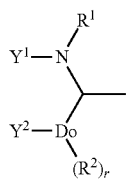

(II)

In the carbene ligand of the formula II, the symbols are each defined as follows:

Do is a donor atom selected from the group consisting of N, C, P, O, S and Si, preferably N, P, O and S, more preferably N; r is 2 when Do is C or Si, is 1 when Do is N or P, and is 0 when Do is O or S;

$Y^1, Y^2$
are each independently hydrogen or a carbon-containing group selected from the group consisting of alkyl, cycloalkyl, heterocycloalkyl, aryl, heteroaryl, aralkyl, alkenyl and alkynyl groups, where the groups may be substituted or unsubstituted; or $Y^1$ and $Y^2$ together form a saturated or unsaturated bridge between the donor atom Do and the nitrogen atom, which has at least two atoms, preferably two or three atoms, where one or more atoms of the bridge may optionally be substituted by alkyl or aryl groups, where the groups may be substituted or unsubstituted, and/or groups with donor or acceptor action, and the bridge may optionally be fused to one or more rings;

$R^1, R^2$
are each independently hydrogen, alkyl, cycloalkyl, heterocycloalkyl, aryl, heteroaryl, aralkyl, alkynyl, alkenyl radicals, where the groups may be substituted or unsubstituted, $BR^3_2$, $NR^{22}_2$, $PR^{23}_2$, $OR^{24}$, $SR^{25}$ or $SIR^4_3$, preferably hydrogen, substituted or unsubstituted alkyl, cycloalkyl, aralkyl radicals; or in the case that n>1—

$R^1$ and/or $R^2$ may each independently, together with one of the $R^1$ and/or $R^2$ radicals of one or two carbene ligands of the formula II, form a bridge, where the bridge may be defined as follows:

alkylene, arylene, heteroarylene, alkynylene, alkenylene, where the groups may be substituted or unsubstituted, $NR^5$, $PR^6$, $BR^7$, $BR^8_2{}^-$, $CR^9(O^-)$, $SO_2$, $SiR^{10}R^{11}$, CO, CO—O, O—CO and $(CR^{12}R^{13})_x$ where one or more nonadjacent $(CR^{12}R^{13})$ groups may be replaced by arylene, heteroarylene, alkynylene, alkenylene, where the groups may be substituted or unsubstituted, $NR^5$, $PR^6$, $BR^7$, $BR^8_2{}^-$, $CR^9(O^-)$, O, S, SO, $SO_2$, $SiR^{10}R^{11}$, CO, CO—O, or O—CO;

where
x is from 2 to 10, preferably from 2 to 5, more preferably from 2 to 3;

$R^3, R^4, R^5, R^6, R^7, R^8, R^9, R^{10}, R^{11}, R^{22}, R^{23}, R^{24}, R^{25}$
are each independently hydrogen, alkyl, cycloalkyl, heterocycloalkyl, aryl, aralkyl, heteroaryl, alkenyl, alkynyl, alkoxy, where the groups may be substituted or unsubstituted, preferably hydrogen, alkyl, cycloalkyl, aryl, alkoxy, more preferably hydrogen, alkyl or alkoxy; and $R^{12}, R^{13}$
are each independently hydrogen, alkyl, cycloalkyl, heterocycloalkyl, aryl, heteroaryl, aralkyl, alkynyl, alkenyl, where the groups may be substituted or unsubstituted, or groups with donor or acceptor action, for example amino or alkoxy, preferably hydrogen, alkyl, cycloalkyl, aryl, amino or alkoxy, more preferably hydrogen, alkyl, amino.

It is essential that, in the transition metal-carbene complexes of the formula I, the carbene ligand(s) of the formula II is bonded to the transition metal atom $M^1$ exclusively via carbene carbon atoms. There is no cyclometalation of the carbene ligand(s) via non-carbene in the transition metal-carbene complexes of the formula I.

For the $Y^1$ and $Y^2$ groups in the context of the present application:

The substituents of the $Y^1$ and $Y^2$ groups may together form a bridge having at least two atoms, preferably having a total of from two to four atoms, more preferably from two to three atoms, of which one or more atoms, preferably one or two atoms, may be heteroatoms, preferably N or B, and the remaining atoms are carbon atoms, such that the NCDo moiety, together with this bridge, preferably forms a 5- to 7-membered, more preferably 5- to 6-membered ring which may optionally have 2 or—in the case of a 6- or 7-membered ring—three double bonds, and may optionally be substituted by alkyl or aryl groups, where the groups may be substituted or unsubstituted, and/or groups having donor or acceptor action, and may optionally comprise heteroatoms, preferably N, preference being given to a 5- or 6-membered aromatic ring which is unsubstituted or substituted by alkyl or aryl groups, where the groups may be substituted or unsubstituted and/or groups with donor or acceptor action, or the preferred 5- or 6-membered aromatic ring is fused to further rings which may optionally comprise at least one heteroatom, preferably N, preferably 6-membered aromatic rings.

Preferred carbene ligands of the formula II thus have the formula IIa specified below:

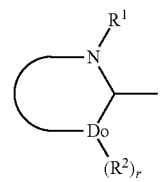

(IIa)

in which Do, $R^1$, $R^2$ and r are each as defined above, and the curved line in the structure IIa represents the bridge formed from $Y^1$ and $Y^2$ together, which is as defined above.

In a particularly preferred embodiment, the NCDo moiety, together with this bridge, forms a 5- to 6-membered ring which, as specified above, may be saturated or unsaturated, substituted and/or fused, preferably benzofused.

The $Y^1$ and/or $Y^2$ groups, and the bridge formed by $Y^1$ and $Y^2$ together, may be bonded to the $R^1$ and/or $R^2$ radical via a bridge, where this bridge may be defined as follows: alkylene, arylene, heteroarylene, alkynylene, alkenylene, where the groups may be substituted or unsubstituted, $NR^2$, $PR^6$, $BR^7$, $BR^8_2{}^-$, $CR^9(O^-)$, $SO_2$, $SiR^{10}R^{11}$, CO, CO—O, O—CO and $(CR^{12}R^{13})_x$, where one or more nonadjacent $(CR^{12}R^{13})$ groups may be replaced by arylene, heteroarylene, alkynylene, alkenylene, where the groups may be substituted or unsubstituted, $NR^5$, $PR^6$, $BR^7$, $BR^8_2{}^-$, $CR^9(O^-)$, O, S, SO, $SO_2$, $SiR^{10}R^{11}$, CO, CO—O, or O—CO, where x is from 2 to 10, preferably from 2 to 5, more preferably 2 to 3;

$R^5$, $R^6$, $R^7$, $R^8$, $R^9$, $R^{10}$, $R^{11}$ are each hydrogen, alkyl, cycloalkyl, heterocycloalkyl, aryl, aralkyl, heteroaryl, alkenyl, alkynyl, alkoxy, where the groups may be substituted or unsubstituted, preferably hydrogen, alkyl, cycloalkyl, aryl, alkoxy, more preferably hydrogen, alkyl or alkoxy; and $R^{12}$, $R^{13}$ are each hydrogen, alkyl, cycloalkyl, heterocycloalkyl, aryl, heteroaryl, aralkyl, alkynyl, alkenyl, where the groups may be substituted or unsubstituted, or groups with donor or acceptor action, for example amino or alkoxy, preferably hydrogen, alkyl, cycloalkyl, aryl, amino or alkoxy, more preferably hydrogen, alkyl, amino.

In the case that $Y^1$ and $Y^2$ together form a bridge to form a 5- to 7-membered ring, the joining bridge to the $R^1$ and/or $R^2$ radical may be joined directly to the 5- to 7-membered ring or be bonded to a substituent of this ring. In the case that the 5- to 7-membered ring formed by a common bridge of $Y^1$ and $Y^2$ is fused to a further 5- to 7-membered ring, the joining bridge may be bonded to an atom of the fused ring.

In the context of the present application, the terms aryl radical or group, heteroaryl radical or group, alkyl radical or group, cycloalkyl radical or group, heterocycloalkyl radical or group, alkenyl radical or group, alkynyl radical or group, aralkyl radical or group, amino group, and groups with donor and/or acceptor action are each defined as follows:

An aryl radical (or group) is understood to mean a radical with a base structure of from 6 to 30 carbon atoms, preferably from 6 to 18 carbon atoms, which is formed from an aromatic ring or a plurality of fused aromatic rings. Suitable base structures are, for example, phenyl, naphthyl, anthracenyl or phenanthrenyl. This base structure may be unsubstituted (i.e. all carbon atoms which are substitutable bear hydrogen atoms) or be substituted at one, more than one or all substitutable positions of the base structure.

Suitable substituents are, for example, alkyl radicals, preferably alkyl radicals having from 1 to 8 carbon atoms, more preferably methyl, ethyl or i-propyl, aryl radicals, preferably $C_6$-aryl radicals, which may in turn be substituted or unsubstituted, heteroaryl radicals, preferably heteroaryl radicals which comprise at least one nitrogen atom, more preferably pyridyl radicals, alkenyl radicals, preferably alkenyl radicals which bear a double bond, more preferably alkenyl radicals having a double bond and from 1 to 8 carbon atoms, or groups with donor or acceptor action. Suitable groups with donor or acceptor action are specified below. Most preferably, the aryl radicals bear substituents selected from the group consisting of methyl, F, Cl, CN, aryloxy and alkoxy, sulfonyl, heteroaryl. The aryl radical or the aryl group is preferably a $C_6$-$C_8$-aryl radical, more preferably a $C_6$-aryl radical, which is optionally substituted by at least one of the aforementioned substituents. The $C_6$-$C_{18}$-aryl radical, preferably $C_6$-aryl radical, more preferably has none, one, two or three of the aforementioned substituents, where, in the case of a $C_6$-aryl radical, one substituent is arranged in the ortho, meta or para position to the further bonding site of the aryl radical, and—in the case of two substituents—they may each be arranged in the meta position or ortho position to the further bonding site of the aryl radical, or one radical is arranged in the ortho position and one radical in the meta position, or one radical is arranged in the ortho or meta position and the further radical is arranged in the para position. In the case of three substituents, they are preferably arranged in the ortho position (two of the three substituents) and p-position (third substituent) to the further bonding site of the aryl radical.

A heteroaryl radical or a heteroaryl group is understood to mean radicals which differ from the aforementioned aryl radicals in that at least one carbon atom in the base structure of the aryl radicals is replaced by a heteroatom. Preferred heteroatoms are N, O and S. Most preferably, one or two carbon atoms of the base structure of the aryl radicals are replaced by heteroatoms. Especially preferably, the base structure is selected from systems such as pyridine and five-membered heteroaromatics such as pyrrole, furan, pyrazole, imidazole, thiophene, oxazole, thiazole. The base structure may be substituted at one, more than one or all substitutable positions of the base structure. Suitable substituents are the same as have already been mentioned for the aryl groups.

An alkyl radical or an alkyl group is understood to mean a radical having from 1 to 20 carbon atoms, preferably from 1 to 10 carbon atoms, more preferably from 1 to 8 carbon atoms, most preferably from 1 to 4 carbon atoms. This alkyl radical may be branched or unbranched and optionally be interrupted by one or more heteroatoms, preferably Si, N, O or S, more preferably N, O or S. In addition, this alkyl radical may be substituted by one or more of the substituents mentioned for the aryl groups. It is likewise possible that the alkyl radical bears one or more (hetero)aryl groups. In this context, all of the (hetero)aryl groups listed above are suitable. The alkyl radicals are more preferably selected from the group consisting of methyl, ethyl, isopropyl, n-propyl, n-butyl, isobutyl and tert-butyl; very particular preference is given to methyl, isopropyl and n-butyl.

A cycloalkyl radical or a cycloalkyl group is understood to mean a radical having from 3 to 20 carbon atoms, preferably from 3 to 10 carbon atoms, more preferably from 3 to carbon atoms. This base structure may be unsubstituted (i.e. all carbon atoms which are substitutable bear hydrogen atoms) or be substituted at one, more than one or all substitutable positions of the base structure. Suitable substituents are the groups already mentioned above for the aryl radicals. Examples of suitable cycloalkyl radicals are cyclopropyl, cyclopentyl and cyclohexyl.

A heterocycloalkyl radical or a heterocycloalkyl group are understood to mean radicals which differ from the aforementioned cycloalkyl radicals in that at least one carbon atom in the base structure of the cycloalkyl radicals is replaced by a heteroatom. Preferred heteroatoms are N, O and S. Most preferably, one or two carbon atoms of the base structure of the cycloalkyl radicals are replaced by heteroatoms. Examples of suitable heterocycloalkyl radicals are radicals derived from pyrrolidine, piperidine, piperazine, tetrahydrofuran, dioxane.

An aralkyl radical (or group) is understood to mean a radical having a base structure of from 6 to 30 carbon atoms, preferably from 6 to 18 carbon atoms, which may be unsubstituted or substituted by the radicals mentioned for the aryl groups. Suitable aralkyl groups are, for example, benzyl, phenylethyl and phenylpropyl.

An alkenyl radical or an alkenyl group is understood to mean a radical which corresponds to the aforementioned alkyl radicals having at least two carbon atoms, with the difference that at least one C—C single bond of the alkyl radical is replaced by a C—C double bond. The alkenyl radical preferably has one or two double bonds.

An alkynyl radical or an alkynyl group is understood to mean a radical which corresponds to the aforementioned alkyl radicals having at least two carbon atoms, with the difference that at least one C—C single bond of the alkyl radical is replaced by a C—C triple bond. The alkynyl radical preferably has one or two triple bonds.

An amino group is understood to mean a group of the general formula —NR'R" where R' and R" may each independently be hydrogen, alkyl or aryl. In addition, R' and R", together with the nitrogen atom, may form a ring, preferably a 5- or 6-membered ring. The ring may be saturated or unsaturated and optionally be substituted by alkyl or aryl groups. Suitable alkyl and aryl groups are mentioned above.

In the context of the present application, the terms alkylene, arylene, heteroarylene, alkynylene and alkenylene are as defined for the alkyl, aryl, heteroaryl, alkynyl and alkenyl radicals, with the difference that the alkylene, arylene, heteroarylene, alkynylene and alkenylene groups have two binding sites to atoms of the ligand of the formula II.

Preferred alkylene groups are $(CR^4_2)_n$ where $R^4$ is H or alkyl, preferably H, methyl or ethyl, more preferably H, and n is from 1 to 3, preferably 1 or 2, more preferably 1. Most preferably, the alkylene group is $CH_2$.

In the context of the present application, a group or a substituent with donor or acceptor action is understood to mean the following groups:

Groups with donor action are understood to mean groups which have a +I and/or +M effect, and groups with acceptor action are understood to mean groups which have a –I and/or –M effect. Suitable groups with donor or acceptor action are halogen radicals, preferably F, Cl, Br, more preferably F, alkoxy radicals, aryloxy radicals, carbonyl radicals, ester radicals, both oxycarbonyl and carbonyloxy, amino groups, amide radicals, $CH_2F$ groups, $CHF_2$ groups, $CF_3$ groups, CN groups, thio groups, sulfonic acid groups, sulfonic ester groups, boronic acid groups, boronic ester groups, phosphonic acid groups, phosphonic ester groups, phosphine radicals, sulfoxide radicals, sulfonyl radicals, sulfide radicals, nitro groups, OCN, borane radicals, silyl groups, stannate radicals, imino groups, hydrazine radicals, hydrazone radicals, oxime radicals, nitroso groups, diazo groups, phosphine oxide groups, hydroxyl groups or SCN groups. Very particular preference is given to F, Cl, CN, aryloxy, alkoxy, amino, $CF_3$ groups, sulfonyl and heteroaryl.

The aryl radicals or groups, heteroaryl radicals or groups, alkyl radicals or groups, cycloalkyl radicals or groups, heterocycloalkyl radicals or groups, alkenyl radicals or groups, alkynyl radicals or groups, aralkyl radicals or groups, amino groups and groups with donor and/or acceptor action, and also the alkylene, arylene, heteroarylene, alkynylene and alkenylene radicals or groups may each be substituted or unsubstituted. In the context of the present application, an unsubstituted group is understood to mean a group in which the substitutable atoms of the group bear hydrogen atoms. In the context of the present application, a substituted group is understood to mean a group in which one or more substitutable atoms bear(s) a substituent instead of a hydrogen atom at least at one position. Suitable substituents are the substituents mentioned above for the aryl radicals or groups.

When radicals with the same numberings occur more than once in the compounds according to the present application, these radicals may each independently be defined as specified.

The carbene ligand of the formula II is preferably a carbene ligand of the formula IIa as mentioned above. The carbene ligand of the formula II is more preferably selected from the group consisting of

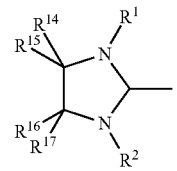

(IIaa)

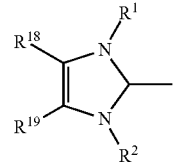

(IIab)

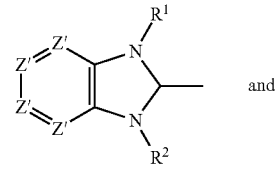

and (IIac)

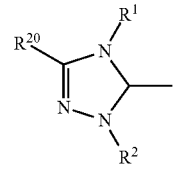

(IIad)

in which the symbols are each defined as follows:

Z' are each independently $CR^{21}$ or N; from 0 to 3 Z' groups are preferably N, more preferably from 0 to 2, most preferably 0 or 1, where the remaining Z' groups are each $CR^{21}$;

$R^{14}, R^{15}, R^{16}, R^{17}, R^{18}, R^{19}, R^{20}$ are each hydrogen, alkyl, cycloalkyl, heterocycloalkyl, aryl, aralkyl, heteroaryl, alkynyl, alkenyl, where the groups may be substituted or unsubstituted, or a group with donor or acceptor action, preferably hydrogen, alkyl or a group with donor or acceptor action, more preferably hydrogen or a group with donor or acceptor action;

$R^{21}$ is hydrogen, alkyl, cycloalkyl, heterocycloalkyl, aryl, heteroaryl, aralkyl, alkynyl, alkenyl, where the groups may be substituted or unsubstituted, or a radical with donor or acceptor action, or in each case two $R^{21}$ radicals together form a fused ring which may optionally comprise at least one heteroatom;

in addition, $R^{14}$ or $R^{15}$ in the moiety IIaa, $R^{18}$ in the moiety IIab, one of the $R^{21}$ radicals in the moiety IIac and $R^{20}$ in the moiety IIad may be bonded via a bridge to $R^1$, and/or $R^{16}$ or $R^{17}$ in the moiety IIaa, $R^{19}$ in the moiety IIab, one of the $R^{21}$ radicals in the moiety IIac may be bonded to $R^2$ via a bridge, where the bridge may be defined as follows:

alkylene, arylene, heteroarylene, alkynylene, alkenylene, where the groups may be substituted or unsubstituted, $NR^5$, $PR^6$, $BR^7$, $BR^8_2{}^-$, $CR^9(O^-)$, O, S, $SO_2$, $SiR^{10}R^{11}$, CO, CO—O, O—CO and $(CR^{12}R^{13})_x$, where one or more nonadjacent $(CR^{12}R^{13})$ groups may be replaced by arylene, heteroarylene, alkynylene, alkenylene, $NR^5$, $PR^6$, $BR^7$, $BR^8_2{}^-$, $CR^9(O^-)$, O, S, SO, $SO_2$, $SiR^{10}R^{11}$, CO, CO—O, O—CO, where x is from 2 to 10, preferably from 2 to 5, more preferably 2 or 3; and $R^5, R^6, R^7, R^8, R^9, R^{10}, R^{11}$ are each hydrogen, alkyl, cycloalkyl, heterocycloalkyl, aryl, aralkyl, heteroaryl, alkenyl, alkynyl, alkoxy, where the groups may be substituted or unsubstituted, preferably hydrogen, alkyl, cycloalkyl, aryl, alkoxy, more preferably hydrogen, alkyl or alkoxy; and $R^{12}, R^{13}$ are each hydrogen, alkyl, cycloalkyl, heterocycloalkyl, aryl, heteroaryl, aralkyl, alkynyl, alkenyl, where the groups may be substituted or unsubstituted, or groups with donor or acceptor action, for example amino or alkoxy, preferably hydrogen, alkyl, cycloalkyl, aryl, amino or alkoxy, more preferably hydrogen, alkyl, amino.

In a particularly preferred embodiment, the carbene ligands of the formula II comprise bridged carbene ligands, in which case there is a bridge via the $R^1$ and/or $R^2$ radical to a further carbene ligand—likewise via the $R^1$ and/or $R^2$ radical of the further carbene ligand. In one embodiment, the present invention thus relates to those transition metal-carbene complexes of the formula I in which n>1 which bear bridged carbene ligands. This means that, in these carbene ligands of the formula II, in one embodiment, $R^1$ and/or $R^2$ each independently form a bridge together with one of the $R^1$ and/or $R^2$ radicals of one or two further carbene ligands, where the bridge may be defined as follows:

alkylene, arylene, heteroarylene, alkynylene, alkenylene, where the groups may be substituted or unsubstituted, $NR^5$, $PR^6$, $BR^7$, $BR^8_2{}^-$, $CR^9(O^-)$, $SO_2$, $SiR^{10}R^{11}$, CO, CO—O, O—CO and $(CR^{12}R^{13})_x$, where one or more nonadjacent $(CR^{12}R^{13})$ groups may be replaced by arylene, heteroarylene, alkynylene, alkenylene, where the groups may be substituted or unsubstituted, $NR^5$, $PR^6$, $BR^7$, $BR^8_2{}^-$, $CR^9(O^-)$, O, S, SO, $SO_2$, $SiR^{10}R^{11}$, CO, CO—O, O—CO; preferably $CH_2$, CH=CH, 1,2-phenylene, CH(amino), CH($O^-$), $BR^8_2{}^-$,

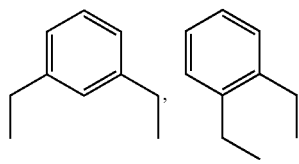

where x is from 2 to 10, preferably from 2 to 5, more preferably 2 or 3; and $R^5, R^6, R^7, R^8, R^9, R^{11}, R^{11}$ are each hydrogen, alkyl, cycloalkyl, heterocycloalkyl, aryl, aralkyl, heteroaryl, alkenyl, alkynyl, alkoxy, where the groups may be substituted or unsubstituted, preferably hydrogen, alkyl, cycloalkyl, aryl, alkoxy, more preferably hydrogen, alkyl or alkoxy; and $R^{12}, R^{13}$ are each hydrogen, alkyl, cycloalkyl, heterocycloalkyl, aryl, heteroaryl, aralkyl, alkynyl, alkenyl, where the groups may be substituted or unsubstituted, or groups with donor or acceptor action, for example amino or alkoxy, preferably hydrogen, alkyl, cycloalkyl, aryl, amino or alkoxy, more preferably hydrogen, alkyl, amino.

Examples of suitable bridged carbene ligands of the formula II are carbene ligands of the following structures:

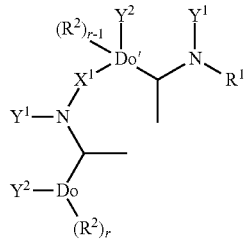

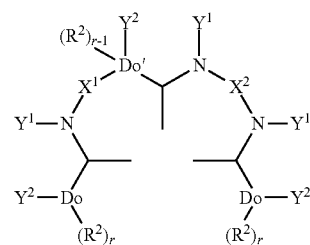

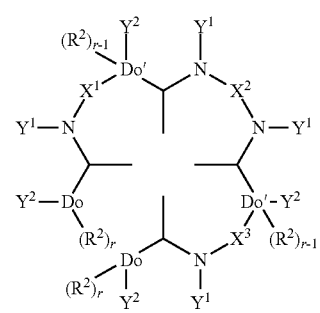

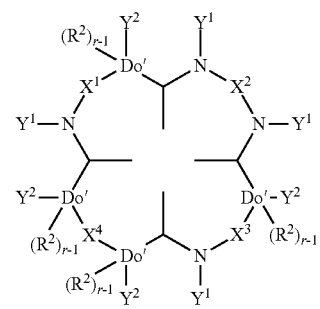

in which $Y^1$, $Y^2$, $R^2$, r and Do are each as defined above, and Do' is a donor atom selected from the group consisting of N, C, P and Si; and $X^1, X^2, X^3, X^4$ are each independently alkylene, arylene, heteroarylene, alkynylene, alkenylene, where the groups may be substituted or unsubstituted, $NR^5$, $PR^6$, $BR^7$, $BR^8_2{}^-$, $CR^9(O^-)$, $SO_2$, $SiR^{10}R^{11}$, CO, CO—O, O—CO and $(CR^{12}R^{13})_x$, where one or more nonadjacent $(CR^{12}R^{13})$ groups may be replaced by arylene, heteroarylene, alkynylene, alkenylene, where the groups may be substituted or unsubstituted, $NR^5$, $PR^6$, $BR^7$, $BR^8_2{}^-$, $CR^9(O^-)$, O, S, SO, $SO_2$, $SiR^{10}R^{11}$, CO, CO—O, O—CO; preferably $CH_2$, CH=CH, 1,2-phenylene, CH(amino), CH(O—), $BR^8_2{}^-$,

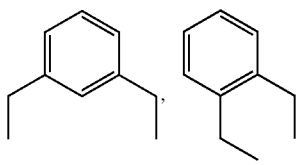

where
x is from 2 to 10, preferably from 2 to 5, preferably 2 or 3; and
$R^5, R^6, R^7, R^8, R^9, R^{10}, R^{11}$ are each hydrogen, alkyl, cycloalkyl, heterocycloalkyl, aryl, aralkyl, heteroaryl, alkenyl, alkynyl, alkoxy, where the groups may be substituted or unsubstituted, preferably hydrogen, alkyl, cycloalkyl, aryl, alkoxy, more preferably hydrogen, alkyl or alkoxy; and $R^{12}, R^{13}$ are each hydrogen, alkyl, cycloalkyl, heterocycloalkyl, aryl, heteroaryl, aralkyl, alkynyl, alkenyl, where the groups may be substituted or unsubstituted, or groups with donor or acceptor action, for example amino or alkoxy, preferably hydrogen, alkyl, cycloalkyl, aryl, amino or alkoxy, more preferably hydrogen, alkyl, amino.

The $Y^1$ and $Y^2$ groups in the aforementioned bridged carbene ligands preferably form a bridge having at least two atoms, preferably having a total of from two to four atoms, more preferably from two to three atoms, of which one or more atoms, preferably one or two atoms, may be heteroatoms, preferably N, and the remaining atoms are carbon atoms, such that the NCDo moiety, together with this bridge, preferably forms a 5- to 7-membered, more preferably 5- to 6-membered ring, which may optionally have 2 or—in the case of a 6- or 7-membered ring—three double bonds, and may optionally be substituted by alkyl or aryl groups, where the groups may be substituted or unsubstituted, and/or groups with donor or acceptor action, and may optionally comprise heteroatoms, preferably N, preference being given to a 5-membered or 6-membered aromatic ring which is unsubstituted or substituted by alkyl or aryl groups, where the groups may be substituted or unsubstituted, and/or groups with donor or acceptor action, or the preferred 5-membered or 6-membered aromatic ring is fused to further rings which may optionally comprise at least one heteroatom, preferably N, preferably 6-membered aromatic rings.

Preferred bridged carbene ligands thus have the following general formulae:

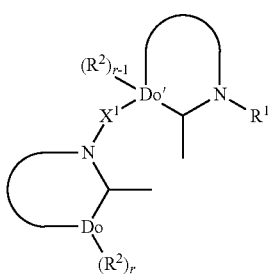

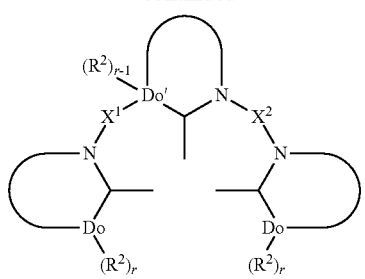

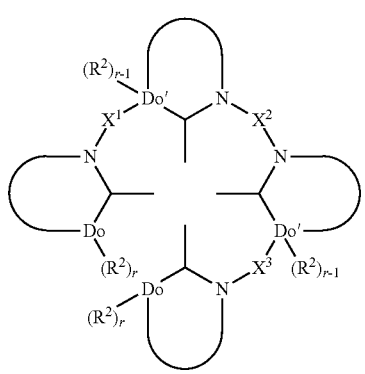

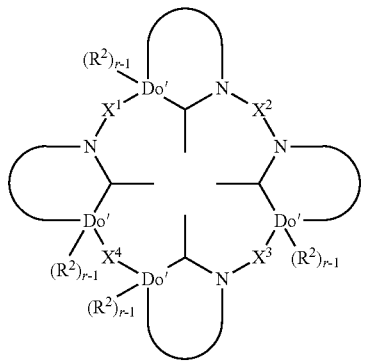

in which $R^2$, r, Do, $X^1, X^2, X^3, X^4$ and Do' are each as defined above, and the curved line represents the bridge formed from $Y^1$ and $Y^2$ together, which is as defined above.

In the bridged carbene ligands illustrated above, Do and Do' are preferably each N.

Particularly preferred bridges formed by $Y^1$ and $Y^2$ are the bridges shown in the structures IIaa, IIab, IIac and IIad.

Carbene ligands of the formula II used with very particular preference in the transition metal-carbene complexes of the formula I are selected from

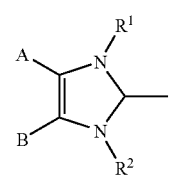

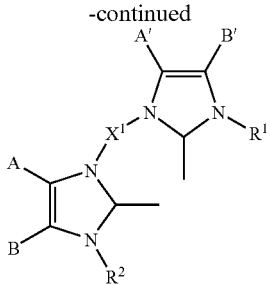

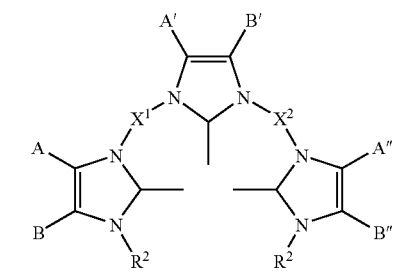

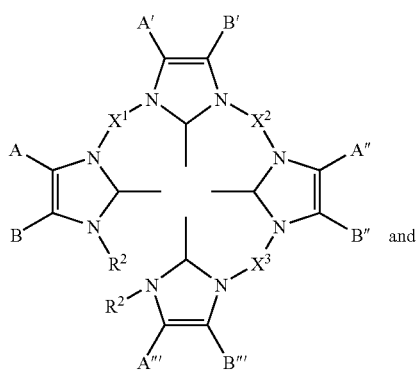

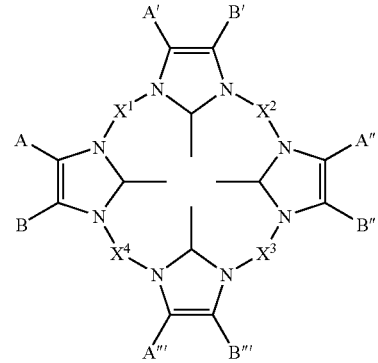

where the symbols $R^1$, $R^2$, $X^1$, $X^2$, $X^3$ and $X^4$ are each as defined above, and A, A', A", A'"
  are each $R^{18}$, and
B, B', B", B'"
  are each $R^{19}$, where
$R^{18}$ in the A, A', A", A'" groups and $R^{19}$ in the B, B', B", B'" groups may in each case be defined identically or differently; or A and B, A' and B', A" and B" or A'" and B'"
  each independently together form a radical of the following formula:

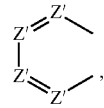

so as to give rise to a fused ring, where

Z' in the A and B, A' and B', A" and B" and A'" and B'" groups may in each case be defined identically or differently;

where suitable $R^{18}$, $R^{19}$ radicals and suitable Z' groups have already been mentioned above.

The transition metal-carbene complexes of the formula I preferably have carbene ligands of the formula II in which the A, A', A" and A'" groups and the B, B', B", B'" groups, and A and B, A' and B', A" and B", and A'" and B'" are in each case defined identically.

In the transition metal-carbene complexes of the formula I, both bridged and unbridged carbene ligands may be present alongside one another, but it is likewise possible that the transition metal-carbene complex of the formula I bears only one or more than one unbridged carbene ligand or only one or more than one bridged carbene ligand. Transition metal-carbene complexes used with preference are shown below:

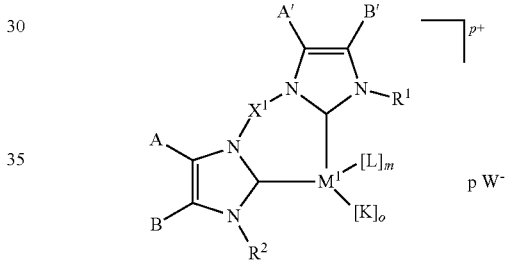

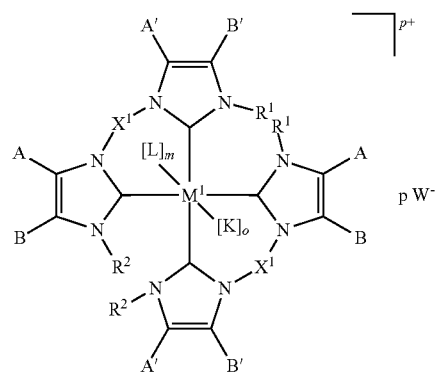

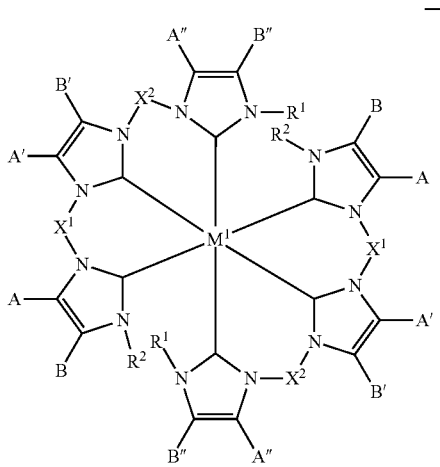

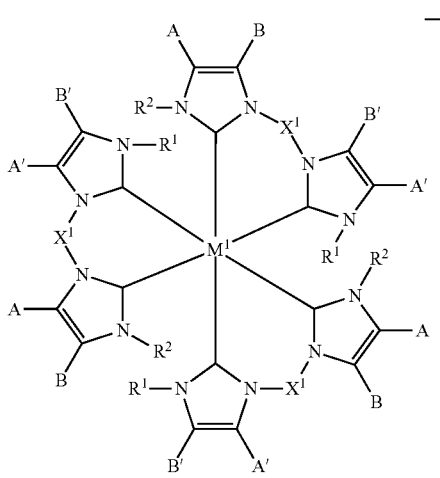

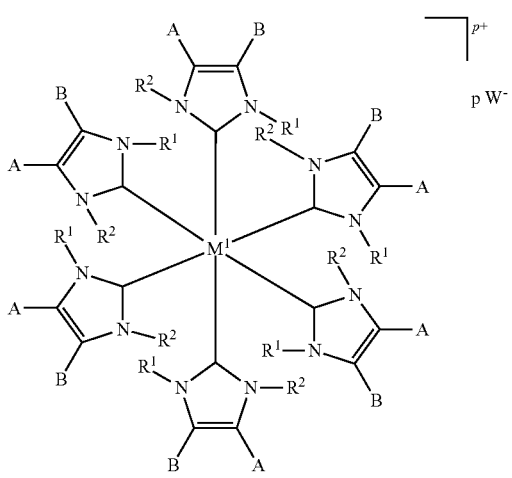

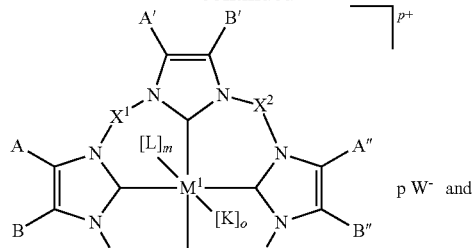

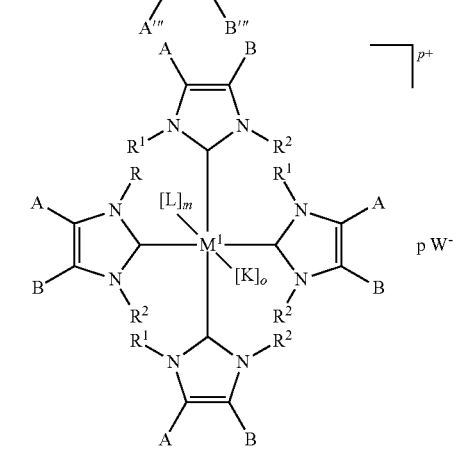

The symbols $M^1$, L, K, W, m, o, p, $R^1$, $R^2$, A, A', A", A'", B, B', B", B'", $X^1$, $X^2$, $X^3$ and $X^4$ are each as defined above.

In a particularly preferred embodiment of the present application, the symbols $M^1$, K, L, m and o in the transition metal-carbene complexes of the general formula I are each:

$M^1$ is Pt, Os, Ru, Ir, more preferably Pt(II), Pt(IV), Ir(I), Ir(III), Os(II), Ru(II);

K is an uncharged mono- or bidentate ligand;

L is $Cl^-$, $Br^-$, $I^-$, $CN^-$, $OAc^-$, alkoxide, thiolate; or unsubstituted bisphenoxide, unsubstituted bisalkoxide, unsubstituted bisthiolate, unsubstituted bisazolate or unsubstituted bisamide;

m is from 0 to 5, preferably from 0 to 3, more preferably from 0 to 2;

o is from 0 to 5, preferably from 0 to 3, more preferably from 0 to 2, most preferably 0;

p is 0, 1, 2 or 3, preferably 0, 1 or 2;

$W^-$ is halide, pseudohalide or OAc, more preferably $Cl^-$, $Br^-$, $I^-$, $CN^-$, $OAc^-$, most preferably $Br^-$ or $I^-$;

$R^1$, $R^2$ are each independently substituted or unsubstituted alkyl, preferably methyl, i-propyl, n-butyl, substituted or unsubstituted cycloalkyl, preferably cyclohexyl, or substituted or unsubstituted aralkyl, preferably benzyl;

A, A', A", A'" are each $R^{18}$;

B, B', B", B'" are each $R^{19}$; where $R^{18}$ in the A, A', A", A'" groups and $R^{19}$ in the B, B', B", B'" groups are each independently hydrogen or groups having donor or acceptor action; or A and B, A' and B', A" and B" or A'" and B'" each independently together form a radical of the following formula:

so as to give rise to a fused ring, where

Z' in the A and B, A' and B', A" and B" and A'" and B'" groups may in each case be defined identically or differently;

Z' are each independently $CR^{21}$ or N; from 0 to 3 Z' groups are preferably N, more preferably from 0 to 2, most preferably 0 or 1, where the remaining Z' groups are each $CR^{21}$;

$R^{21}$ is hydrogen, alkyl, cycloalkyl, heterocycloalkyl, aryl, heteroaryl, aralkyl, alkynyl, alkenyl, where the groups may be substituted or unsubstituted, or a radical with donor or acceptor action, or in each case two $R^{21}$ radicals together form a fused ring which may optionally comprise at least one heteroatom;

where the A, A', A" and A'" groups and the B, B', B" and B'" groups, or the A and B, A' and B', A" and B", and A'" and B'" groups, are more preferably each defined identically;

$X^1, X^2, X^3, X^4$ are each independently $CH_2$, CH=CH, 1,2-phenylene, CH(amino), $CH(O^-)$, $BR^8{}_2{}^-$, where $R^8$ is hydrogen, alkyl, cycloalkyl or aryl, where the groups may be substituted or unsubstituted, preferably hydrogen or alkyl.

Suitable transition metal-carbene complexes of the formula I are specified below by way of example:

tetracarbene complexes, for example in which:

$M^1$ is Pt, Pd;

$X^1$ are each independently $CH_2$, CH=CH, 1,2-phenylene, CH(amino), $CH(O^-)$, $BR^8{}_2{}^-$, where $R^8$ is hydrogen, alkyl, cycloalkyl or aryl, where the groups may be substituted or unsubstituted, preferably hydrogen or alkyl, for example methyl, ethyl, isopropyl;

$R^1, R^2$ are each independently substituted or unsubstituted alkyl, e.g. methyl, isopropyl, n-butyl, substituted or unsubstituted cycloalkyl, e.g. cyclohexyl, substituted or unsubstituted aryl, e.g. 2,4,6-methylphenyl, substituted or unsubstituted aralkyl, e.g. benzyl;

$W^-$ is halide, pseudohalide or $OAc^-$, more preferably $Cl^-$, $Br^-$, $I^-$, $CN^-$, $OAc^-$, most preferably $Br^-$ or $I^-$.

Tetracarbene complexes, for example

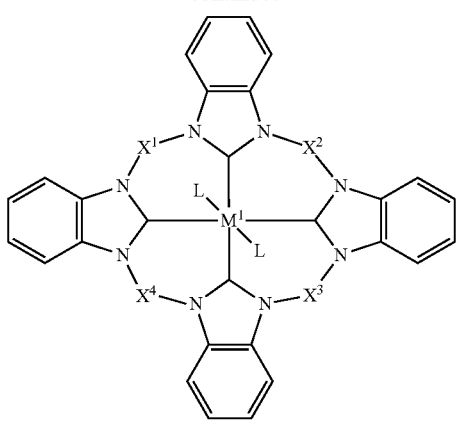

in which:

M¹ is Os, Ru;

X¹, X², X³, X⁴ are each independently CH$_2$, CH=CH, 1,2-phenylene, CH(amino), CH(O⁻), BR$^8{}_2{}^-$,

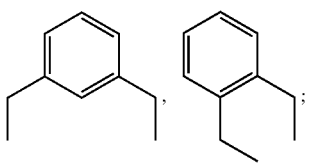

where R⁸ is hydrogen, alkyl, cycloalkyl or aryl, where the groups may be substituted or unsubstituted, preferably hydrogen or alkyl, for example methyl, ethyl, isopropyl;

L is halide, e.g. Br⁻, I⁻; pseudohalide, e.g. CN⁻, or OAc⁻.

Tetracarbene complexes, for example

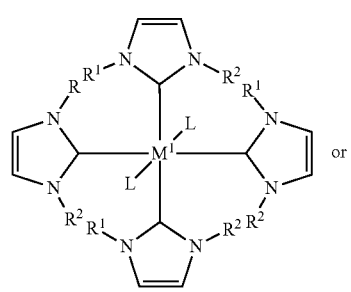

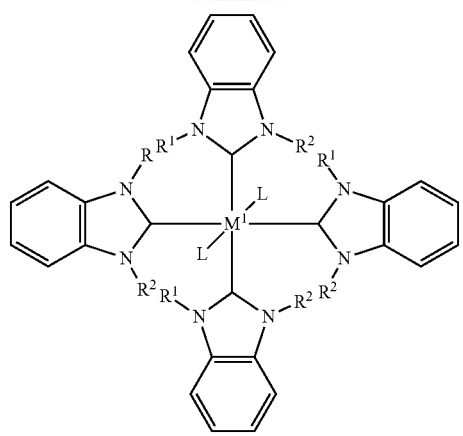

in which:

M¹ is Os, Ru;

R¹, R² are each independently substituted or unsubstituted alkyl, e.g. methyl, isopropyl, n-butyl, substituted or unsubstituted cycloalkyl, e.g. cyclohexyl, substituted or unsubstituted aryl, e.g. 2,4,6-methylphenyl, substituted or unsubstituted aralkyl, e.g. benzyl;

L is halide, e.g. Br⁻, I⁻; pseudohalide, e.g. CN⁻, or OAc⁻.

Biscarbene complexes, for example

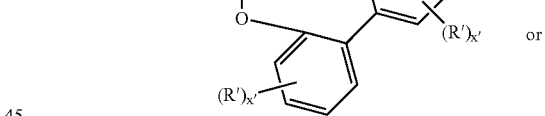

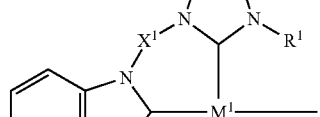

in which:

M¹ is Pt, Pd;

X¹ is independently CH$_2$, CH=CH, 1,2-phenylene, CH(Amino),

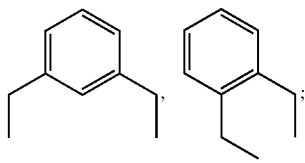

R$^1$, R$^2$ are each independently substituted or unsubstituted alkyl, e.g. methyl, isopropyl, n-butyl, substituted or unsubstituted cycloalkyl, e.g. cyclohexyl, substituted or unsubstituted aryl, e.g. 2,4,6-methylphenyl, substituted or unsubstituted aralkyl, e.g. benzyl;

R' is C$_1$-C$_6$-alkyl or donor/acceptor substituents, preferably methyl, ethyl, isopropyl, tert-butyl;

x' is 0, 1, 2, 3 or 4, preferably 0, 1, 2 or 3, more preferably 0, 1 or 2, most preferably 0.

The transition metal-carbene complexes of the formula I used in accordance with the invention may in principle be prepared by processes known to those skilled in the art or analogously to processes known to those skilled in the art. Suitable general processes for preparing carbene complexes are detailed, for example, in the review articles W. A. Hermann et al., Advances in Organometallic Chemistry, 2001, Vol. 48, 1 to 69, W. A. Hermann et al., Angew. Chem. 1997, 109, 2256 to 2282 and G. Bertrand et al., Chem. Rev. 2000, 100, 39 to 91 and the literature cited therein. Further preparation processes are specified, for example, in Ch.-M. Che et al., Organometallics 1998, 17, 1622 to 1630, M. Albrecht et al., Inorganica Chimica Acta 2006, Vol 359, 6, 1929-1938 and W. J. Youngs et al., J. Organomet. Chem. 671 (2003) 183 to 186, and in DE-A 10 2005 058 206.

Typically, the transition metal-carbene complexes of the formula I are prepared from the precursors corresponding to carbene ligands and suitable metal complexes comprising the desired metal.

Suitable ligand precursors of the carbene ligands are known to those skilled in the art. They are preferably cationic precursors of the general formula III

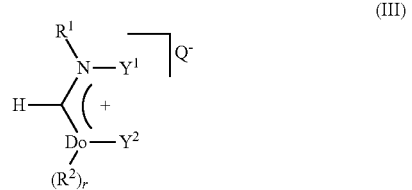

(III)

in which

Q' is a monoanionic counterion, preferably halide, pseudohalide, BF$_4^-$, BPh$_4^-$, PF$_6^-$, AsF$_6^-$ or SbF$_6^-$, and the further radicals, symbols and indices in the ligand precursor of the general formula III are each as defined above.

Suitable ligand precursors are thus, for example, imidazolium salts, bisimidazolium salts, tetraimidazolium salts and derivatives thereof.

The ligand precursors of the general formula III may be prepared by processes known to those skilled in the art. Suitable processes for preparing the ligand precursors are specified in the literature specified above and literature cited therein. Some of the suitable ligand precursors are commercially available.

Preference is given to preparing the transition metal-carbene complexes of the formula I by reacting at least one ligand precursor of the general formula III with at least one metal complex comprising at least one metal M$^1$ where M$^1$ is as defined above.

The molar ratio between the ligand precursors of the formula III and the metal complex comprising at least one metal M$^1$ depends on the structure of the desired transition metal-carbene complex of the formula I and on the type of the carbene ligand, i.e. on whether the carbene ligands are one or more unbridged monocarbene ligands or one or more bridged bis-, tri- or tetracarbene ligands. In the case that n in the transition metal-carbene complexes of the formula I is >1, it is possible that these transition metal-carbene complexes are obtained by reacting the metal complex comprising at least one metal M$^1$ with identical carbene ligands or by reacting it with different carbene ligands. It is thus possible to prepare homo- and heteroleptic transition metal-carbene complexes of the formula I. Suitable processes and reaction sequences for the preparation of the different transition metal-carbene complexes of the formula I are known to those skilled in the art.

The metal complex comprising at least one metal M$^1$ is a metal complex comprising at least one metal atom selected from the group consisting of transition metals of group IIB, IIIB, IVB, VB, VIIB, VIIB, VIII of the Periodic Table of the Elements (CAS version) and Cu, preferably selected from the group consisting of Ir, Co, Rh, Ni, Pd, Pt, Fe, Ru, Os, Cr, Mo, W, Mn, Tc, Re and Cu, more preferably Ir, Os, Ru, Rh, Pd, Co and Pt, most preferably Ir, Pt, Rh, Pd, Ru and Os in any oxidation state possible for the particular metal.

Suitable metal complexes are known to those skilled in the art. Examples of suitable metal complexes are: Pd(OAc)$_2$, Pt(cod)Cl$_2$, Pt(cod)Me$_2$, Pt(acac)$_2$, Pt(PPh$_3$)$_2$Cl$_2$, PtCl$_2$, [Rh(cod)Cl]$_2$, Rh(acac)CO(PPh$_3$), Rh(acac)(CO)$_2$, Rh(cod)$_2$BF$_4$, RhCl(PPh$_3$)$_3$, RhCl$_3$.nH$_2$O, Rh(acac)$_3$, [Os(CO)$_3$I$_2$]$_2$, [Os$_3$(CO)$_{12}$], OsH$_4$(PPh$_3$)$_3$Cp$_2$Os, Cp*$_2$Os, H$_2$OsCl$_6$.6H$_2$O, OsCl$_3$.H$_2$O, Ru(acac)$_3$, RuCl$_2$(cod), Ru(2-methylallyl)$_2$(cod), [(μ-Cl)Ir(η$^4$-1,5-cod)]$_2$, [(μ-Cl)Ir(η$^2$-coe)$_2$]$_2$, Ir(acac)$_3$, IrC$_3$.nH$_2$O, (tht)$_3$IrCl$_3$, Ir(η$^3$-allyl)$_3$, Ir(η$^3$-methallyl)$_3$, in which cod is cyclooctadiene, coe is cyclooctene, acac is acetylacetonate and tht is tetrahydrothiophene. The metal complexes can be prepared by processes known to those skilled in the art or are commercially available.

When the carbene ligand used is a bridged biscarbene ligand of the general formula

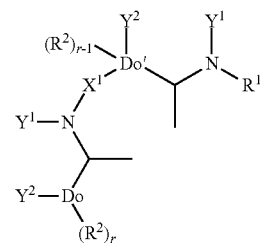

(in which the symbols are each as defined above)

it is possible to react it with an approximately equimolar amount of an appropriate metal complex comprising at least one metal M$^1$ to obtain the corresponding biscarbene complexes. In addition, it is possible to react the metal complex comprising at least one transition metal atom M$^1$ with about double the stoichiometric amount of one or two different biscarbene ligands. In this case, tetracarbene complexes can be obtained. Depending on whether the biscarbene ligands used are identical or different biscarbene ligands, it is possible to obtain homo- or heteroleptic tetracarbene complexes. The tetracarbene complexes comprising two biscarbene ligands can be prepared either by reacting the appropriate metal complex comprising at least one transition metal atom $M^1$ with about double the stoichiometric amount of one or two different carbene ligands, or by first reacting an appropriate biscarbene complex by reacting the metal complex comprising at least one transition metal atom $M^1$ with approximately stoichiometric amounts of a biscarbene ligand and then reacting the resulting biscarbene complex with an approximately stoichiometric amount of a further—identical or different—biscarbene complex.

After the aforementioned reaction of the metal complex with one or more ligand precursors, the resulting transition metal-carbene complex of the formula I is worked up and optionally purified by processes known to those skilled in the art. Typically, workup and purification are effected by extraction, column chromatography and/or recrystallization by processes known to those skilled in the art.

The transition metal-carbene complexes of the formula I are used in organic light-emitting diodes (OLEDs). They are suitable as emitter substances, since they have an emission (electroluminescence) in the visible region of the electromagnetic spectrum. With the aid of the transition metal-carbene complexes of the formula I used in accordance with the invention as emitter substances, it is possible to provide compounds which exhibit electroluminescence in the red, green and in the blue region of the electromagnetic spectrum with good efficiency. At the same time, the quantum yield is high and the stability of the transition metal-carbene complexes of the formula I used in accordance with the invention in the device is high.

In addition, the inventive transition metal-carbene complexes of the formula I are suitable as electron, exciton or hole blockers, or hole conductors, electron conductors, hole injection layer or matrix material in OLEDs, depending on the ligands used and the central metal used.

Organic light-emitting diodes (OLEDs) are in principle composed of several layers:
1. Anode (1)
2. Hole-transporting layer (2)
3. Light-emitting layer (3)
4. Electron-transporting layer (4)
5. Cathode (5)

However, it is also possible that the OLED does not have all of the layers mentioned; for example an OLED having the layers (1) (anode), (3) (light-emitting layer) and (5) (cathode) is likewise suitable, in which case the functions of the layers (2) (hole-transporting layer) and (4) (electron-transporting layer) are assumed by the adjacent layers. OLEDs which have the layers (1), (2), (3) and (5), or the layers (1), (3), (4) and (5), are likewise suitable.

The transition metal-carbene complexes of the formula I may be used in various layers of an OLED. The present invention therefore further provides an OLED comprising at least one transition metal-carbene complex of the formula I. The transition metal-carbene complexes of the formula I are used preferably in the light-emitting layer, more preferably as emitter molecules. The present invention therefore further provides a light-emitting layer comprising at least one transition metal-carbene complex of the formula I, preferably as an emitter molecule. Preferred transition metal-carbene complexes of the formula I have been specified above.

The transition metal-carbene complexes of the formula I used in accordance with the invention may be present in bulk—without further additives—in the light-emitting layer or another layer of the OLED, preferably in the light-emitting layer. However, it is likewise possible and preferred that, in addition to the transition metal-carbene complexes of the formula I, further compounds are present in the layers, preferably in the light-emitting layer. For example, a fluorescent dye may be present in the light-emitting layer in order to alter the emission color of the transition metal-carbene complex of the formula I used as an emitter molecule. In addition—in a preferred embodiment—a diluent material may be used. This diluent material may be a polymer, for example poly(N-vinylcarbazole) or polysilane. However, the diluent material may likewise be a small molecule, for example 4,4'-N,N'-dicarbazolebiphenyl (CDP=CBP) or tertiary aromatic amines.

The individual aforementioned layers of the OLED may in turn be composed of 2 or more layers. For example, the hole-transporting layer may be composed of one layer into which holes are injected from the electrode and one layer which transports the holes from the hole-injecting layer away into the light-emitting layer. The electron-transporting layer may likewise consist of a plurality of layers, for example one layer in which electrons are injected by the electrode and one layer which receives electrons from the electron-injecting layer and transports them into the light-emitting layer. These specified layers are each selected according to factors such as energy level, thermal resistance and charge carrier mobility, and also energy differential of the layers mentioned with the organic layers or the metal electrodes. Those skilled in the art are capable of selecting the structure of the OLEDs in such a way that it is adapted optimally to the transition metal-carbene complexes of the formula I used in accordance with the invention, preferably as emitter substances.

In order to obtain particularly efficient OLEDs, the HOMO (highest occupied molecular orbital) of the hole-transporting layer should be aligned to the work function of the anode, and the LUMO (lowest unoccupied molecular orbital) of the electron-transporting layer aligned to the work function of the cathode.

The present application further provides an OLED comprising at least one inventive light-emitting layer. The further layers in the OLED may be composed of any material which is typically used in such layers and is known to those skilled in the art.

The anode (1) is an electrode which provides positive charge carriers. It may be composed, for example, of materials which comprise a metal, a mixture of different metals, a metal alloy, a metal oxide or a mixture of different metal oxides. Alternatively, the anode may be a conductive polymer. Suitable metals include the metals of groups 11, 4, 5 and 6 of the Periodic Table of the Elements, and also the transition metals of groups 8 to 10. When the anode is to be transparent, mixed metal oxides of groups 12, 13 and 14 of the Periodic Table of the Elements are generally used, for example indium tin oxide (ITO). It is likewise possible that the anode (1) comprises an organic material, for example polyaniline, as described, for example, in Nature, Vol. 357, pages 477 to 479 (Jun. 11, 1992). At least either the anode or the cathode should be at least partly transparent in order to be able to omit the light formed.

Suitable hole-transporting materials for the layer (2) of the inventive OLED are disclosed, for example, in Kirk-Othmer Encyclopedia of Chemical Technology, 4th Edition, Vol. 18, pages 837 to 860, 1996. Either hole-transporting molecules or polymers may be used as the hole-transporting material. Customarily used hole-transporting molecules are selected from the group consisting of 4,4'-bis[N-(1-naphthyl)-N-phenylamino]biphenyl (α-NPD), N,N'-diphenyl-N,N'-bis(3-methylphenyl)-[1,1'-biphenyl]-4,4'-diamine (TPD), 1,1-bis[(di-4- tolylamino)phenyl]cyclohexane (TAPC), N,N'-bis(4-methylphenyl)-N,N'-bis(4-ethylphenyl)-[1,1'-(3,3'-dimethyl)biphenyl]-4,4'-diamine (ETPD), tetrakis(3-methylphenyl)-N,N,N',N'-2,5-phenylenediamine (PDA), α-phenyl-4-N,N-diphenylaminostyrene (TPS), p-(diethylamino)benzaldehyde diphenylhydrazone (DEH), triphenylamine (TPA), bis[4-(N,N-diethylamino)-2-methylphenyl](4-methylphenyl)methane (MPMP), 1-phenyl-3-[p-(diethylamino)styryl]-5-[p-(diethylamino)phenyl]pyrazoline (PPR or DEASP), 1,2-trans-bis(9H-carbazol-9-yl)cyclobutane (DCZB), N,N,N',N'-tetrakis(4-methylphenyl)-(1,1'-biphenyl)-4,4'-diamine (TTB), 4,4',4"-tris(N,N-diphenylamino)triphenylamine (TDTA) and porphyrin compounds, and also phthalocyanines such as copper phthalocyanines. Customarily used hole-transporting polymers are selected from the group consisting of polyvinylcarbazoles, (phenylmethyl)polysilanes, PEDOT (poly(3,4-ethylenedioxythiophene)), preferably PEDOT doped with PSS (polystyrenesulfonate), and polyanilines. It is likewise possible to obtain hole-transporting polymers by doping hole-transporting molecules into polymers such as polystyrene and polycarbonate. Suitable hole-transporting molecules are the molecules already mentioned above.

Suitable electron-transporting materials for the layer (4) of the inventive OLEDs include metals chelated with oxinoid compounds, such as tris(8-hydroxyquinolato)aluminum ($Alq_3$), compounds based on phenanthroline such as 2,9-dimethyl-4,7-diphenyl-1,10-phenanthroline (DDPA=BCP) or 4,7-diphenyl-1,10-phenanthroline (DPA) and azole compounds such as 2-(4-biphenylyl)-5-(4-t-butylphenyl)-1,3,4-oxadiazole (PBD) and 3-(4-biphenylyl)-4-phenyl-5-(4-t-butylphenyl)-1,2,4-triazole (TAZ). The layer (4) may serve both to ease the electron transport and as a buffer layer or as a barrier layer in order to prevent quenching of the exciton at the interfaces of the layers of the OLED. The layer (4) preferably improves the mobility of the electrons and reduces quenching of the exciton.

Of the materials specified above as hole-transporting materials and electron-transporting materials, some can fulfill a plurality of functions. For example, some of the electron-conducting materials are simultaneously hole-blocking materials when they have a low-lying HOMO.

The charge transport layers may also be electronically doped in order to improve the transport properties of the materials used, in order firstly to make the layer thicknesses more generous (avoidance of pinholes/short circuits) and secondly to minimize the operating voltage of the device. For example, the hole-transporting materials may be doped with electron acceptors; for example, phthalocyanines or arylamines such as TPD or TDTA may be doped with tetrafluorotetracyanoquinodimethane (F4-TCNQ). The electron-transporting materials may, for example, be doped with alkali metals, for example $Alq_3$ with lithium. Electronic doping is known to those skilled in the art and is disclosed, for example, in W. Gao, A. Kahn, J. Appl. Phys., Vol. 94, No. 1, Jul. 1, 2003 (p-doped organic layers); A. G. Werner, F. Li, K. Harada, M. Pfeiffer, T. Fritz, K. Leo, Appl. Phys. Lett., Vol. 82, No. 25, Jun. 23, 2003 and Pfeiffer et al., Organic Electronics 2003, 4, 89-103.

The cathode (5) is an electrode which serves to introduce electrons or negative charge carriers. The cathode may be any metal or nonmetal which has a lower work function than the anode. Suitable materials for the cathode are selected from the group consisting of alkali metals of group 1, for example Li, Cs, alkaline earth metals of group 2, metals of group 12 of the Periodic Table of the Elements, comprising the rare earth metals and the lanthanides and actinides. In addition, metals such as aluminum, indium, calcium, barium, samarium and magnesium, and combinations thereof, may be used. In addition, lithium-comprising organometallic compounds or LiF may be applied between the organic layer and the cathode in order to reduce the operating voltage.

The OLED of the present invention may additionally comprise further layers which are known to those skilled in the art. For example, a layer which eases the transport of the positive charge and/or matches the band gaps of the layers to one another may be applied between the layer (2) and the light-emitting layer (3). Alternatively, this further layer may serve as a protective layer. In an analogous manner, additional layers may be present between the light-emitting layer (3) and the layer (4) in order to ease the transport of the negative charge and/or to match the band gaps between the layers to one another. Alternatively, this layer may serve as a protective layer.

In a preferred embodiment, the inventive OLED, in addition to the layers (1) to (5), comprises at least one of the further layers mentioned below:

a hole injection layer between the anode (1) and the hole-transporting layer (2);

a blocking layer for electrons and/or excitons between the hole-transporting layer (2) and the light-emitting layer (3);

a blocking layer for holes and/or excitons between the light-emitting layer (3) and the electron-transporting layer (4);

an electron injection layer between the electron-transporting layer (4) and the cathode (5).

As already mentioned above, it is, however, also possible that the OLED does not have all of the layers (1) to (5) mentioned; for example, an OLED having the layers (1) (anode), (3) (light-emitting layer) and (5) (cathode) is likewise suitable, in which case the functions of the layers (2) (hole-transporting layer) and (4) (electron-transporting layer) are assumed by the adjacent layers. OLEDs which have the layers (1), (2), (3) and (5) or the layers (1), (3), (4) and (5) are likewise suitable.

Those skilled in the art know how suitable materials have to be selected (for example on the basis of electrochemical investigations). Suitable materials for the individual layers and suitable OLED structures are known to those skilled in the art and disclosed, for example, in WO2005/113704.

Furthermore, each of the specified layers of the inventive OLED may be composed of two or more layers. In addition, it is possible that some or all of the layers (1), (2), (3), (4) and (5) have been surface-treated in order to increase the efficiency of charge carrier transport. The selection of the materials for each of the layers mentioned is preferably determined by obtaining an OLED having a high efficiency.

The inventive OLED can be produced by methods known to those skilled in the art. In general, the OLED is produced by successive vapor deposition of the individual layers onto a suitable substrate. Suitable substrates are, for example, glass or polymer films. For the vapor deposition, customary techniques may be used, such as thermal evaporation, chemical vapor deposition and others. In an alternative process, the organic layers may be coated from solutions or dispersions in suitable solvents, in which case coating techniques known to those skilled in the art are employed. Compositions which, in addition to the at least one transition metal-carbene complex of the formula I, have a polymeric material in one of the layers of the OLED, preferably in the light-emitting layer, are generally applied as a layer by means of solution-mediated processes.

In general, the different layers have the following thicknesses: anode (1) from 500 to 5000 Å, preferably from 1000 to 2000 Å; hole-transporting layer (2) from 50 to 1000 Å, preferably from 200 to 800 Å; light-emitting layer (3) from 10 to 1000 Å, preferably from 100 to 800 Å; electron-transporting layer (4) from 50 to 1000 Å, preferably from 200 to 800 Å; cathode (5) from 200 to 10 000 Å, preferably from 300 to 5000 Å. The position of the recombination zone of holes and electrons in the inventive OLED and thus the emission spectrum of the OLED may be influenced by the relative thickness of each layer. This means that the thickness of the electron transport layer should preferably be selected such that the electron/hole recombination zone is within the light-emitting layer. The ratio of the layer thicknesses of the individual layers in the OLED is dependent upon the materials used. The layer thicknesses of any additional layers used are known to those skilled in the art.

Use of the transition metal-carbene complexes of the formula I in at least one layer of the inventive OLED, preferably as emitter molecules in the light-emitting layer of the inventive OLEDs, allows OLEDs with high efficiency to be obtained. The efficiency of the inventive OLEDs may additionally be improved by optimizing the other layers. For example, highly efficient cathodes such as Ca, Ba or LiF may be used. Shaped substrates and novel hole-transporting materials which bring about a reduction in the operating voltage or an increase in the quantum efficiency are likewise usable in the inventive OLEDs. Furthermore, additional layers may be present in the OLEDs in order to adjust the energy level of the different layers and to ease electroluminescence.

The inventive OLEDs may be used in all devices in which electroluminescence is useful. Suitable devices are preferably selected from stationary and mobile visual display units. Stationary visual display units are, for example, visual display units of computers, televisions, visual display units in printers, kitchen appliances and advertising panels, illuminations and information panels. Mobile visual display units are, for example, visual display units in cellphones, laptops, cameras, in particular digital cameras, vehicles and destination displays on buses and trains.

In addition, the transition metal-carbene complexes of the formula I may be used in OLEDs with inverse structure. The transition metal-carbene complexes of the general formula I used in accordance with the invention are preferably used in these inverse OLEDs in turn in the light-emitting layer. The structure of inverse OLEDs and the materials customarily used therein are known to those skilled in the art.

The examples which follow provide additional illustration of the invention:

EXAMPLES

A) 2,2'-Biphenoxide disodium salt 1

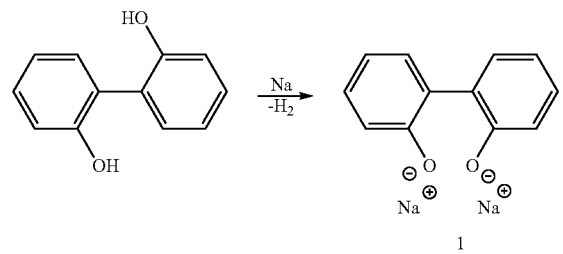

32.22 mmol of elemental sodium (0.741 g) are initially charged in 10 ml of dry tetrahydrofuran. 16.11 mmol of 2,2'-biphenol in 10 ml of dry tetrahydrofuran are added dropwise to the mixture at room temperature. The reaction mixture is stirred at room temperature for 2 days. Then the residue is filtered off and dried under high vacuum. The white solid 1 is obtained.

| Empirical formula: | $C_{12}H_8O_2Na_2$ | M = 230.164 g/mol |
|---|---|---|
| Yield: | 3.274 g (88.3% of theory) | |

$^1$H NMR (ppm, $d_6$-DMSO, 300.13 MHz):
δ=7.28 (br, 1H, arom. C$\underline{H}$); 7.03 (br, 1H, arom. C$\underline{H}$); 6.74 (br, 2H, arom. C$\underline{H}$); 6.58 (br, 2H, arom. C$\underline{H}$); 6.30 (br, 1H, arom. C$\underline{H}$); 6.08 (br, 1H, arom. C$\underline{H}$)

$^{13}$C NMR (ppm, $d_6$-DMSO, 75.475 MHz):
δ=163.36 ($\underline{C}_{ipso}$—O); 129.80 ($C_{ipso}$); 129.29 (arom. $\underline{C}$H); 126.70 (arom. $\underline{C}$H); 118.90 (arom. $\underline{C}$H); 113.99 (arom. $\underline{C}$H)

B) (1,1'-Dimethyl-3,3'-methylenediimidazoline-2,2'-diylidene)platinum(II) dibromide 2

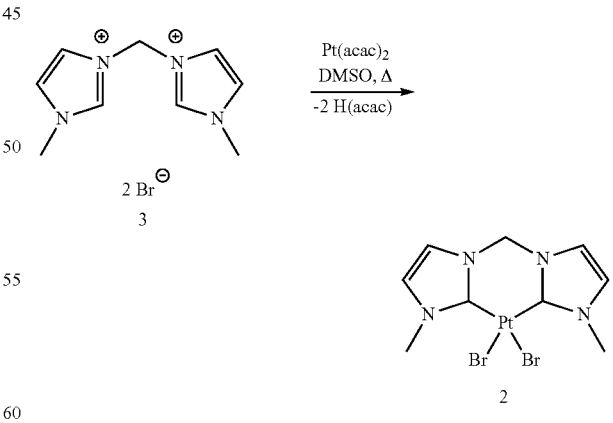

0.5 mmol of platinum(II) acetylacetonate (0.197 g) is initially charged in 3 ml of dimethyl sulfoxide and heated to 100° C. To this is added, with the aid of a syringe pump over 13 hours, a solution of 0.5 mmol of 1,1'-dimethyl-3,3'-methylenediimidazolium dibromide 3 (0.169 g) in 20 ml of dimethyl sulfoxide. The overall reaction mixture is stirred at 100°

C. for a further 2 hours. Thereafter, the solvent is removed under reduced pressure at 70° C. and the solid formed is washed twice with a little water and twice with a little tetrahydrofuran. The white solid 2 still has to be dried.

| Empirical formula: | $C_9H_{12}N_4PtBr_2$ | M = 531.112 g/mol |
|---|---|---|
| Yield: | 0.179 g (67.4% of theory) | |
| Melting point: | decomposition at > 380° C. | |

$^1$H (ppm, $d_6$-DMSO, 300.13 MHz):
δ=7.53 (d, 2H, J=2.0 Hz, NC$\underline{H}$CHN); 7.31 (d, 2H, J=2.0 Hz, NCHC$\underline{H}$N); 6.10 (AB, 1H, J=13.1 Hz, NC$\underline{H}_2$N); 5.96 (AB, 1H, J=13.1 Hz, NC$\underline{H}_2$N); 3.84 (s, 6H, C$\underline{H}_3$ group)

C) (1,1'-Dimethyl-3,3'-methylenediimidazoline-2,2'-diylidene)platinum(II) ditetrafluoroborate 4

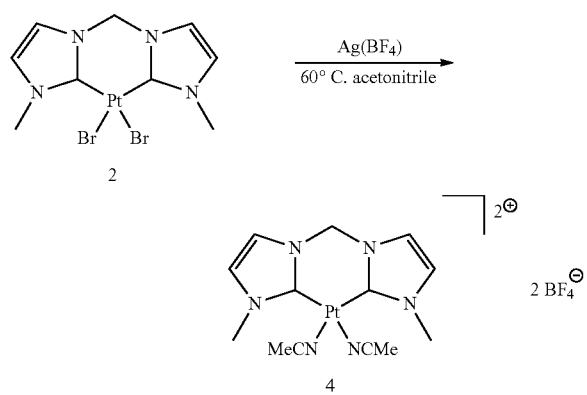

0.75 mmol of silver tetrafluoroborate (0.147 g) in 6 ml of acetonitrile is added to 0.38 mmol of (1,1'-dimethyl-3,3'-methylenediimidazoline-2,2'-diylidene)platinum(II) dibromide 2 (0.200 g). The mixture is stirred with exclusion of light at 60° C. for 8 hours. The silver bromide which precipitates out is filtered off and the solvent is removed under reduced pressure. This forms a white solid 4. The product should be stored under argon.

| Empirical formula: | $C_9H_{12}N_4B_2F_8Pt$ | M = 544.910 g/mol |
|---|---|---|
| Yield: | 0.220 g (100% of theory) | |
| Melting point: | decomposition at > 190° C. | |

$^1$H NMR (ppm, $d_6$-DMSO, 300.13 MHz):
δ=7.72 (s, 2H, NC$\underline{H}$CHN); 7.53 (d, 2H, J=1.6 Hz, NCHC$\underline{H}$N); 6.30 (s, 2H, NC$\underline{H}_2$N); 3.88 (s, 6H, C$\underline{H}_3$ group)
$^{13}$C NMR (ppm, $d_6$-DMSO, 75.475 MHz):
δ=129.10 ($C_{carbene}$); 123.33 (NCH$\underline{C}$HN); 121.79 (N$\underline{C}$HCHN); 61.54 (N$\underline{C}$H$_2$N); 36.47 ($\underline{C}$H$_3$ group)
$^{19}$F NMR (ppm, $d_6$-DMSO, 282.4 MHz):
δ=-148.24 (B$\underline{F}_4$)

| Elemental analysis for $C_9H_{12}N_4B_2F_8Pt$: | | | |
|---|---|---|---|
| | C | H | N |
| calculated | 19.84% | 2.22% | 10.28% |
| found | 24.82% | 2.88% | 12.79% |

D) (1,1'-Dimethyl-3,3'-methylenediimidazoline-2,2'-diylidene)platinum(II) 2″,2‴-biphenoxide 5

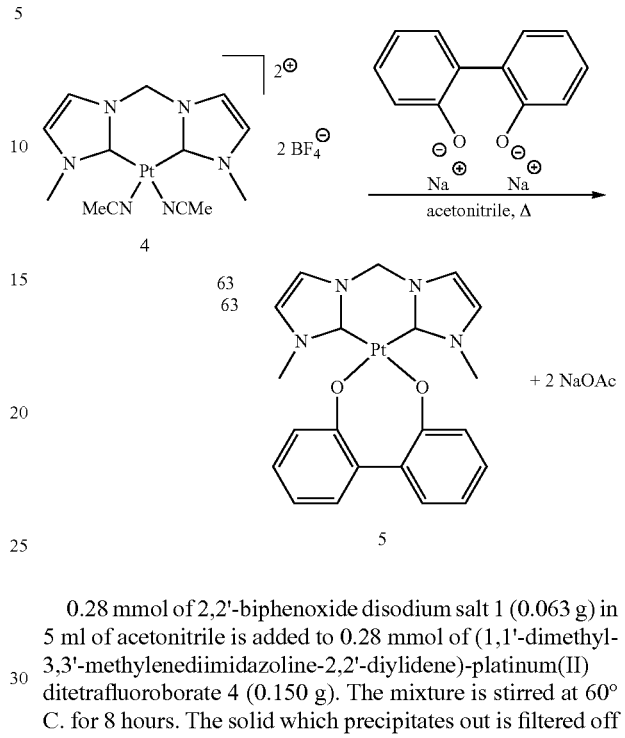

0.28 mmol of 2,2'-biphenoxide disodium salt 1 (0.063 g) in 5 ml of acetonitrile is added to 0.28 mmol of (1,1'-dimethyl-3,3'-methylenediimidazoline-2,2'-diylidene)-platinum(II) ditetrafluoroborate 4 (0.150 g). The mixture is stirred at 60° C. for 8 hours. The solid which precipitates out is filtered off and dried under reduced pressure. This forms a white solid 5.

| Empirical formula: | $C_{21}H_{20}N_4O_2Pt$ | M = 555.488 g/mol |
|---|---|---|
| Yield: | 0.033 g (21.2% of theory) | |
| Melting point: | decomposition at > 330° C. | |

$^1$H NMR (ppm, $d_6$-DMSO, 300.13 MHz):
δ=7.52 (d, 2H, J=1.9 Hz, NC$\underline{H}$CHN); 7.13 (d, 2H, J=2.0 Hz, NCHC$\underline{H}$N); 7.03 (m, 2H, J=7.2 Hz, arom. C$\underline{H}$); 6.85 (m, 2H, J=7.3 Hz, arom. C$\underline{H}$); 6.76 (m, 2H, J=7.3 Hz, arom. C$\underline{H}$); 6.43 (m, 2H, J=7.2 Hz, arom. C$\underline{H}$); 6.35 (AB, 1H, J=12.9 Hz, NC$\underline{H}_2$N); 6.22 (AB, 1H, J=13.0 Hz, NC$\underline{H}_2$N); 3.33 (s, 6H, C$\underline{H}_3$ group)
$^{13}$C NMR (ppm, $d_6$-DMSO, 75.475 MHz):
δ=164.63 ($\underline{C}_{ipso}$—O); 140.99 ($C_{carbene}$); 132.36 ($C_{ipso}$); 130.20 (arom. $\underline{C}$H); 126.82 (arom. $\underline{C}$H); 122.16 (NCH$\underline{C}$HN); 120.32 (N$\underline{C}$HCHN); 118.67 (arom. $\underline{C}$H); 114.38 (arom. $\underline{C}$H); 61.50 (N$\underline{C}$H$_2$N); 35.01 ($\underline{C}$H$_3$ group)

| Elemental analysis for $C_{21}H_{20}N_4O_2Pt$: | | | |
|---|---|---|---|
| | C | H | N |
| calculated | 45.40% | 3.63% | 10.09% |
| found | 40.23% | 3.28% | 7.83% |

Photoluminescence Data

In order to characterize the inventive transition metal carbene complex further in the diluted solid state, an appropriate PMMA (polymethyl methacrylate) film comprising 2% by weight of the transition metal complex in PVP is produced. For the PMMA film, 2 mg of transition metal carbene complex 5 are dissolved in 1 ml of 10% (by mass) PMMA solution (PMMA in dichloromethane) and a 60 μm coating bar is used to coat a film onto a microscope slide (quartz glass). The film is then dried. The photoluminescence data of the transition metal carbene complex are determined on the film obtained.

Excitation wavelength: 325 nm

Emission wavelength: 469 nm

The invention claimed is:

1. An organic light-emitting diode comprising at least one transition metal-carbene complex of formula (I)

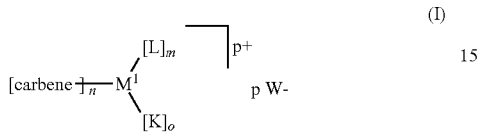

in which the symbols are each defined as follows:

$M^1$ is a metal atom selected from the group consisting of transition metals of group IIB, IIIB, IVB, VB, VIB, VIIB, VIII of the Periodic Table of the Elements (CAS version) and Cu, in any oxidation state possible for the particular metal atom;

L is a mono- or dianionic ligand which may be mono- or bidentate selected from the group consisting of $Cl^-$, $Br^-$, $I^-$, $CN^-$, $OAc^-$, alkyl radical which are bonded to the transition metal atoms $M^1$ via a sigma bond and acetylacetoneate and derivatives thereof;

m is from 0 to 5;

o is 0;

n is from 1 to 6;

p is the charge of the complex: 0, 1, 2, 3, 4;

$W^-$ is a monoanionic counterion;

where m, n and p are dependent upon the oxidation state and coordination number of the metal atom used and upon the charge of the ligands and the overall charge of the complex, and carbene is a carbene ligand selected from the group consisting of

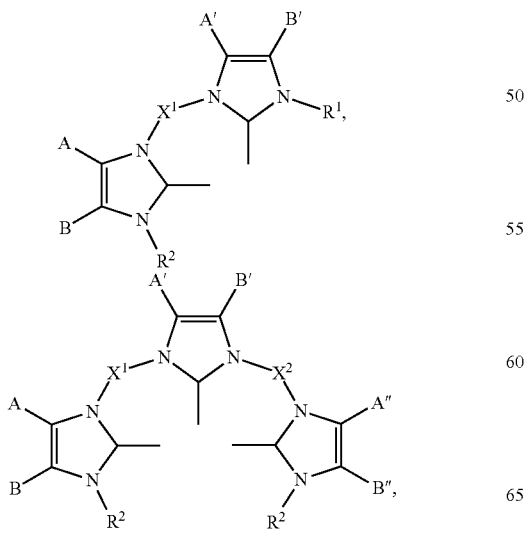

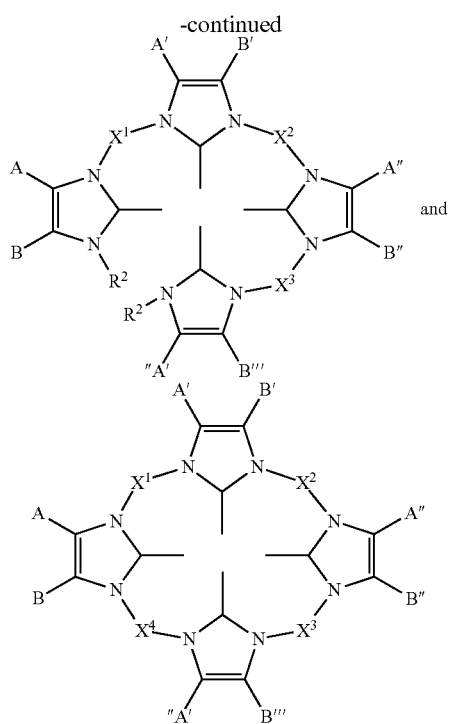

in which the symbols are each defined as follows:

$R^1$, $R^2$ are each independently hydrogen, alkyl or cycloalkyl groups, where the groups may be substituted by $CH_3$, F, Cl or CN or unsubstituted, or a $C_6$-aryl radical, which is substituted by at least two of the substituents mentioned, where the substituents are arranged in the ortho position to the further bonding site of the aryl radical, in the case of three substituents, they are arranged in the ortho position (two of the three substituents) and p-position (third substituent) to the further bonding site of the aryl radical;

$X^1$, $X^2$, $X^3$, $X^4$ are each independently alkylene, 1,2-phenylene,

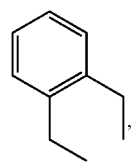

alkynylene or alkenylene groups, where the groups may be substituted or unsubstituted;

A, A', A", A''' are each $R^{18}$, and

B, B', B", B''' are each $R^{19}$, where $R^{18}$ in A, A', A", A''' and $R^{19}$ in B, B', B", B''' may in each case be defined identically or differently;

or groups A and B, A' and B', A" and B" or A''' and B''' each independently form a radical of the following formula:

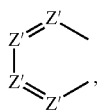

so as to give rise to a fused ring, where

Z' in the A and B, A' and B', A" and B" and A'" and B'" groups may in each case be defined identically or differently;

$R^{18}$, $R^{19}$
are each hydrogen, alkyl, cycloalkyl, heterocycloalkyl, aryl, aralkyl, heteroaryl, alkynyl or alkenyl groups, where the groups may be substituted or unsubstituted, or a substituent with donor or acceptor action;

Z' are each independently $CR^{21}$ or N;

$R^{21}$ is hydrogen, alkyl, cycloalkyl, heterocycloalkyl, aryl, heteroaryl, aralkyl, alkynyl alkenyl groups, where the groups may be substituted or unsubstituted, or a radical with donor or acceptor action, or in each case two $R^{21}$ radicals together form a fused ring which may optionally comprise at least one heteroatom wherein the carbene ligand(s) in the transition metal complexes of the formula I is bonded to the transition metal exclusively via carbene carbon atoms.

2. The organic light-emitting diode according to claim 1, wherein the transition metal-carbene complex is selected from

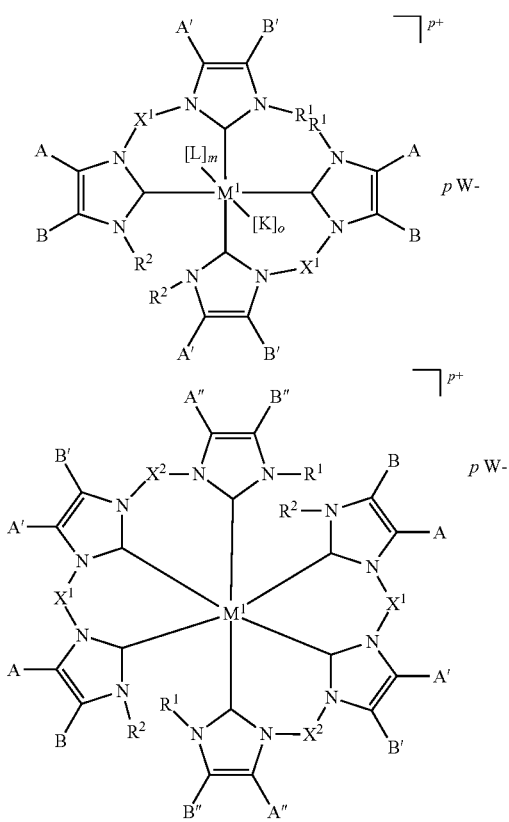

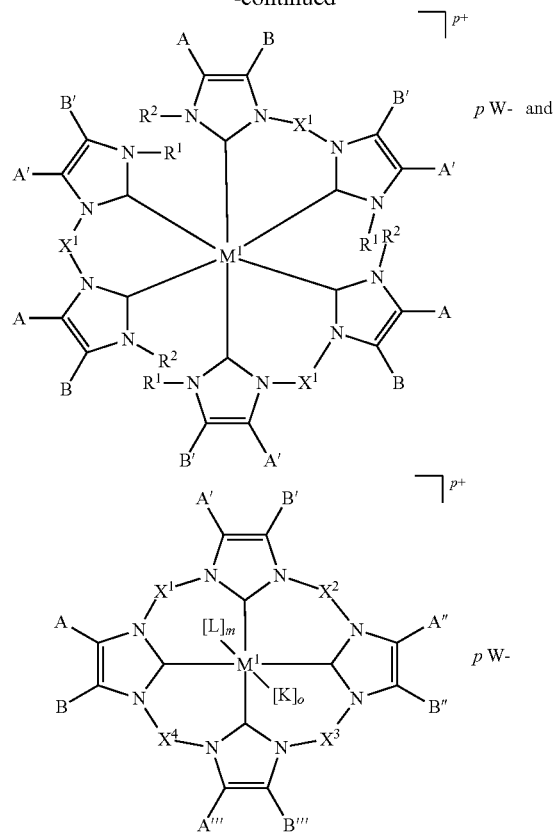

in which the symbols are each defined as follows:

$M^1$ is Pt, Os, Ru, Ir;

L is $Cl^-$, $Br^-$, $I^-$, $CN^-$ or $OAc^-$ m is from 0 to 5;

o is 0;

p is 0, 1, 2 or 3;

$W^-$ is halide, pseudohalide or $OAc^-$;

$R^1$, $R^2$ are each independently substituted or unsubstituted alkyl;

A, A', A", A'"
are each $R^{18}$; and

B, B', B", B'"
are each $R^{19}$; where $R^{18}$ in A, A', A", A'" and $R^{19}$ in B, B', B", B'" are each independently hydrogen or groups having donor or acceptor action;

or groups A and B, A' and B', A" and B" or A'" and B'"
each independently form a radical of the following formula:

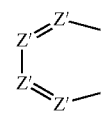

so as to give rise to a fused ring, where

Z' in the A and B, A' and B', A" and B" and A'" and B'" groups may in each case be defined identically or differently;

Z' are each independently $CR^{21}$ or N;

$R^{21}$ is hydrogen, or an alkyl, cycloalkyl, heterocycloalkyl, aryl, heteroaryl, aralkyl, alkynyl or alkenyl group, where the groups may be substituted or unsubstituted, or a radical with donor or acceptor action, or in each case two $R^{21}$ radicals together form a fused ring which may optionally comprise at least one heteroatom; and $X^1, X^2, X^3, X^4$ are each independently $CH_2$, CH=CH, 1,2-phenylene, CH(amino) or

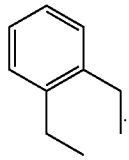

3. A light-emitting layer comprising at least one transition metal-carbene complex of formula I as defined in claim 1.

4. A device selected from the group consisting of stationary visual display units, illuminations, and mobile visual display units, comprising at least one organic light-emitting diode according to claim 1.

* * * * *

UNITED STATES PATENT AND TRADEMARK OFFICE
CERTIFICATE OF CORRECTION

PATENT NO. : 8,940,904 B2  
APPLICATION NO. : 12/306791  
DATED : *January 27, 2015  
INVENTOR(S) : Evelyn Fuchs et al.

Page 1 of 1

It is certified that error appears in the above-identified patent and that said Letters Patent is hereby corrected as shown below:

On the title page, Item (54) and in the Specification, Column 1, the Title is incorrect. Item (54) and Column 1 should read:

--USE OF TRANSITION METAL-CARBENE COMPLEXES WHICH DO NOT COMPRISE ANY CYCLOMETALATION VIA NON-CARBENES IN OLEDS--

Signed and Sealed this  
Fifth Day of May, 2015

Michelle K. Lee  
*Director of the United States Patent and Trademark Office*